(12) United States Patent
Okada et al.

(10) Patent No.: US 6,234,726 B1
(45) Date of Patent: *May 22, 2001

(54) INDEXABLE INSERT

(75) Inventors: Yoshikazu Okada; Liu Meng; Hiroyuki Takahashi, all of Ibaraki-ken (JP)

(73) Assignee: Mitsubishi Materials Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,679

(22) Filed: Jan. 19, 1999

(30) Foreign Application Priority Data

| Jan. 19, 1998 | (JP) | .................................. | 10-008084 |
| Jan. 19, 1998 | (JP) | .................................. | 10-008085 |
| Jan. 19, 1998 | (JP) | .................................. | 10-008087 |

(51) Int. Cl.⁷ .................................................... B23B 27/22
(52) U.S. Cl. ........................... 407/114; 407/115; 407/116
(58) Field of Search .................................... 407/113, 114, 407/115, 116, 100

(56) References Cited

U.S. PATENT DOCUMENTS

| 5,249,894 | * | 10/1993 | Bernadic et al. | ..................... 407/114 |
| 5,265,985 | * | 11/1993 | Boppana et al. | ..................... 407/114 |
| 5,584,616 | * | 12/1996 | Katbi et al. | ........................... 407/114 |
| 5,599,141 | * | 2/1997 | Katbi et al. | ........................... 407/114 |

FOREIGN PATENT DOCUMENTS

| 0109612 | * | 4/1990 | (JP) | ..................................... 407/115 |
| 2565480 | | 1/1992 | (JP) . | |

* cited by examiner

*Primary Examiner*—Henry Tsai
(74) *Attorney, Agent, or Firm*—Oblon, Spivak, McClelland, Maier & Neustadt, P.C.

(57) ABSTRACT

An indexable insert having a tip body formed of a polygonal flat plate. An upper surface of the tip body serves as a rake face, and edges are formed along ridges defined by sides of the rake face. Nose portion edges are formed at corners of the rake face at which the edges adjacent to each other intersect. The nose portion edges each have a rake angle varied between both ends of the nose portion edge.

18 Claims, 17 Drawing Sheets

INDEXABLE INSERT

BACKGROUND OF THE INVENTION

1. Field of the Invention

The present invention relates to an indexable insert which is attached to a tool body of a cutting tool and is used for cutting metal materials, etc.

2. Discussion of the Background

Hitherto, there has been known an indexable insert in which a chip breaker having a specified sectional configuration is formed on a rake face for the ejection of chips. In such an indexable insert, in order to improve the chip ejection efficiency, the slope of a wall surface 2 of the chip breaker, which rises from a rake face 1, has been set depending on the depth of the cut (infeed) as shown in FIGS. 26 and 27, for example. Specifically, an indexable insert having a cross-section shown in FIG. 26 is intended to improve the chip ejection efficiency in a low infeed range by setting an angle α of the slope of the breaker wall 2 so that the breaker wall rises steeply from an intersection 3 between rake face 1 and the breaker wall. Also, an indexable insert having a cross-section shown in FIG. 27 is intended to improve the chip ejection efficiency in a high infeed range by setting the angle α to be so small that the breaker wall 2 rises gently from the intersection 3.

These conventionally known indexable inserts, however, have disadvantages as follows. In the indexable insert shown in FIG. 26, chips are apt to stuff, so that cut resistance is increased in the high infeed range because the height from an edge 4 to a boss surface 5, i.e., the height h of the breaker wall 2, is too large. Also, in the indexable insert shown in FIG. 27, the breaking action to make chips curled is weak in the low infeed range because the slope of the breaker wall 2 is too gentle. Accordingly, chips tend to become more elongate and the chip ejection efficiency is reduced. Thus, each of the indexable inserts having the above-described constructions have a superior chip ejection ability under one cutting condition, i.e., in the low infeed range or the high infeed range, but suffers from a lowering of the chip ejection efficiency or an increase of the cut resistance under the other cutting condition.

Meanwhile, as shown in FIGS. 28 to 31, by way of example, an indexable insert having a chip breaker with a varied sectional configuration around the corner (nose portion) of a rake face has also been proposed. The tip shown in FIGS. 28 to 31 is constructed such that an upper surface of a tip body 11, which is formed as a flat plate which is substantially rhombic in plan, serves as a rake face 12, lateral surfaces of the tip body 11 each serve as a flank face 13, and an edge 14 is formed along the ridge defined at an intersection between the rake face 12 and each flank face 13, i.e., along the ridge defined by each side of the rhombic rake face 12. Further, at two of the four corners C, C of the rake face 12, where the edges 14 adjacent to each other intersect at an acute angle, a convex arc-shaped nose portion edge 15 is formed in a smooth continuous relationship with the edges 14 on both sides. The rake face 12 is recessed at a specified slope as it extends inwardly from the edge 14 and the nose portion edge 15. The edge 14 and the nose portion edge 15 thus have a positive rake angle θ.

In an inner area of the rake face 12, a chip breaker 16 protrudes upwardly from the rake face 12 with gaps left from the edges 14 and the nose portion edges 15. The chip breaker 16 is formed, as shown in FIG. 28, such that it has a breaker wall surface 17 with a rhombic shape and a size smaller than the rake face 12 inwardly of the edges 14, in a plan view looking in a direction facing the rake face 12 with a uniform gap left from the edges 14. At the corners C, C adjacent to the nose portion edges 15, it extends in the diagonal direction connecting the corners C, C so as to terminate in positions close to the nose portion edges 15. Reference numeral 18 in FIG. 28 denotes an attachment hole in which is inserted a clamp screw or the like used for attaching the tip body 11 to a tool such as a bite.

In practical cutting with the above-mentioned indexable insert, when an infeed and/or a feed is relatively small and an area just around the nose portion edge 15 is used as occurs in finish cutting, the nose portion edge 15 produces chips which are thin and have a small width. These chips are quickly broken into pieces by the above-mentioned indexable insert because they strike against a fore end of the chip breaker 16 positioned close to the corresponding nose portion edge 15 immediately after being produced. On the other hand, when an infeed and/or a feed is relatively large and an area extending from the nose portion edge 15 to the edge 14 is used as occurs in rough cutting, the nose portion edge 15 produces chips which are thick and have a large width. These chips are broken into pieces by the above-mentioned indexable insert in such a manner that they are subject to resistance while sliding over the rake face 12 between the edge 14 and the chip breaker 16, and then strike against the chip breaker 16, whereby they are so bent and curled as to break into pieces. Accordingly, the above-mentioned indexable insert can achieve efficient chip ejection in general universal cutting ranging from rough cutting to ordinary finish cutting.

However, when an infeed and/or a feed is set to a smaller value than in the ordinary finish cutting as occurs in, e.g., superfinish cutting required in precision machining, the produced chips become harder to break into pieces because they are thinner, have a narrower width and tend to be more elongate. At the same time, the part of the nose portion edge 15 which is used for cutting and produces chips also becomes smaller. This results in a difficulty in causing the produced chips to surely strike against the fore end of the chip breaker 16 and break into pieces for ejection even with the universal cutting tip shown in FIGS. 28 to 31. When used in superfinish cutting, therefore, such a universal cutting tip must be modified to make the produced chips surely strike against the breaker wall surface 17 at the fore end of the chip breaker 16 such that the fore end of the chip breaker 16 is positioned closer to the nose portion edge 15, or that the chip breaker 16 has an increased height in a direction of thickness of the tip body 11, or that the breaker wall surface 17 at the fore end of the chip breaker 16 protrudes more steeply in its entirely.

These modified constructions however are not satisfactory for the following reasons. If the fore end of the chip breaker 16 is positioned too close to the nose portion edge 15, when the modified indexable insert is employed in general universal cutting, particularly in rough cutting during which thick and wide chips are produced, the chips strike against the chip breaker 16 before sliding a sufficient distance over the rake face 12, and a pocket space defined between the edge 14 or the nose portion edge 15 and the chip breaker 16 becomes small. As a result, the chips are apt to stuff and the chip ejection ability deteriorates which is not the desired result. Also, easier stuffing of the chips may cause the cut resistance to be so increased as to cause severe vibration, deterioration of finished surface accuracy and shortening of the tip life.

Further, if the fore end of the chip breaker 16 is positioned closer to the nose portion edge 15, the recessed inflecting point P where the breaker wall surface 17 at the fore end of the chip breaker 16 intersects the rake face 12 is also positioned closer to the nose portion edge 15. The closer position of the nose portion edge 15 to the recessed inflecting point P, however raises a fear that the tip body 11 may break at the recessed inflecting point P when the tip is used to cut hard materials, because stresses caused by the cutting load acting upon the nose portion edge 15 tend to be concentrated on the recessed inflecting point P. Further, such a possibility of the tip breakage increases with the rake angle θ having a larger value. In the above-mentioned indexable insert, therefore, it is impossible to improve the sharpness of the edges 14 and the nose portion edges 15 by setting the rake angle θ to a larger value. This means that a further increase in the cut resistance would result.

On the other hand, if the height of the chip breaker 16 is increased, or if the breaker wall surface 17 protrudes more steeply, the chip ejection ability also deteriorates in universal cutting because the produced chips are less smoothly ejected and are more apt to stuff. Additionally, if the breaker wall surface 17 protrudes more steeply, the cut resistance is further increased in universal cutting because thick and wide chips are produced and strike against the breaker wall surface 17.

Up to now, therefore, the tip designed for superfinish cutting, as described above, has had difficulty in covering the entire range of general universal cutting, and a wide range of cutting including general universal cutting and superfinish cutting must have been performed by respective dedicated tips prepared separately.

SUMMARY OF THE INVENTION

One object of the present invention is to provide an indexable insert which can realize reliable and effective chip ejection over a wide range of cutting works from superfinish cutting required in precision machining to general universal cutting.

To achieve the above object, the present invention provides an indexable insert wherein an upper surface of a tip body formed of a polygonal flat plate serves as a rake face, edges are formed along ridges defined by sides of the rake face, and nose portion edges are formed at corners of the rake face at which the edges adjacent to each other intersect, each of the nose portion edges having a rake angle which varies between both ends of the nose portion edge. With the indexable insert having such features, since the rake angle of the nose portion edge is varied between both ends thereof, chips produced by the nose portion edge are subject to a bending moment in the widthwise direction and hence are produced in an easily breakable condition. Specifically, the chips are subject to resistance in the longitudinal direction and bent while sliding over the rake face continuously extending from the nose portion edge, or they strike against the chip breaker formed on the rake face. Hence, even chips which are thin and have a small width, which are produced in superfinish cutting, can be easily broken into pieces. In the superfinish cutting during which an infeed and/or a feed is small, therefore, reliable chip ejection can also be achieved with no need to position the fore end of the chip breaker too close to the nose portion edge as has been proposed conventionally.

As one way of varying the rake angle of the nose portion edge as mentioned above, the rake angle of the nose portion edge may be set to be larger in an intermediate area between both ends of the nose portion edge than at both ends of the nose portion edge. With this feature, both ends of the nose portion edge and the edges formed along the ridges defined by the sides of the rake face in continued relation to both ends can be given with a sufficient edge angle and hence tip strength endurable to such a large cut load as being applied in general finish cutting and rough cutting during which the edges in those portions are used. Also, the rake surface continuously extending from the nose portion edge has the form of a valley that is sloped downwardly in the intermediate area of the nose portion edge toward the center from both ends along the nose portion edge. In superfinish cutting, therefore, the produced chips are guided toward the valley bottom, where they are bent to be more surely broken into pieces. In particular, by setting the rake angle of the nose portion edge to be maximized on a bisector of the corner of the rake face, when a distal end portion of the nose portion edge, i.e., a portion of the nose portion edge lying on the bisector of the corner, is mainly used in cutting as experienced in superfinish cutting during which an infeed and/or a feed are small, it is possible to give high sharpness to the distal end portion of the nose portion edge and to achieve good finished surface accuracy.

As another way of varying the rake angle of the nose portion edge, in opposition to the above feature, the rake angle of the nose portion edge may be set to be smaller in an intermediate area between both ends of the nose portion edge than at both ends of the nose portion edge. In this case, the rake surface continuously extending from the nose portion edge has the form of a hill that gradually protrudes upwardly in the intermediate area of the nose portion edge toward the center from both ends along the nose portion edge. Therefore, the chips produced by the nose portion edge are subject to resistance and bent by being pressed against a slope of the hill while sliding over the rake face. Accordingly, as with the above case, chips can be surely broken into pieces. In particular, by setting the rake angle of the nose portion edge to be minimized on the bisector of the corner, sufficient tip strength can also be given to the distal end portion of the nose portion edge which is used in superfinish cutting. As a result, even when superfinish cutting is performed on a workpiece made of hard materials, for example, the nose portion edge can be prevented from being damaged.

Thus, with the indexable insert of the present invention described above, since the rake angle of the nose portion edge formed at the corner of the rake angle is varied between both ends of the nose portion edge such that it is larger or smaller in the intermediate area between both ends of the nose portion edge than at both ends thereof, the chips produced by the nose portion edge are subject to a bending moment in the widthwise direction at the time of generation thereof, and hence are produced in an easily breakable condition. Those chips are then subject to resistance and bent while sliding over the rake face continuously extending from the nose portion edge, or they strike against the chip breaker, etc., whereby the chips can be surely broken into pieces. Consequently, even the chips, which are produced in superfinish cutting where an infeed and/or a feed is small, can be smoothly ejected with no need of positioning the chip breaker too close to the nose portion edge.

Also, the present invention provides an indexable insert wherein an upper surface of a tip body formed of a polygonal flat plate serves as a rake face, edges are formed along ridges defined by sides of the rake face, nose portion edges are formed at nose portions of the rake face at which the edges adjacent to each other intersect, and a chip breaker is formed on the rake face to protrude upwardly from the rake face and to extend toward the nose portions, and wherein the nose portion edges each have a rake angle formed to gradually increase toward a position lying on a bisector of the nose portion from both ends of the nose portion edge, and a first breaker wall protruding upwardly from the rake face and a second breaker wall protruding upwardly from the first breaker wall at a gentler gradient than that of the first breaker wall are formed in a portion of a breaker wall surface of the chip breaker which faces the nose portion edge.

With the indexable insert having such features, since the rake angle of the nose portion edge is varied to gradually increase toward the position lying on the bisector of the nose portion, i.e., the center of the nose portion edge, from both ends of the nose portion edge, chips produced by the nose portion edge in superfinish cutting or the like are subject to a bending moment in the widthwise direction at the time of generation thereof, and hence are produced in an easily breakable condition. In addition, since the rake angle of the nose portion edge gradually increases toward the center from both ends, the rake surface continuously extending from the nose portion edge has the form of a valley that is sloped downwardly from both ends toward the center along the nose portion edge. With the indexable insert having the above features, therefore, the chips produced in the easily breakable condition are subject to resistance and bent in the longitudinal direction while sliding over the rake face. In addition, those chips are guided to the bottom of the valley defined by the rake face and bent there, following which they are guided along the valley bottom to strike against the breaker wall surface of the chip breaker. As a result, even the thin and narrow chips, which are produced in superfinish cutting, can be surely and easily broken into pieces without having the chip breaker positioned too close to the nose portion edge, or increasing the height of the chip breaker, or raising the breaker wall of the chip breaker at a steep gradient in its entirely.

Further, since the first breaker wall protruding upwardly from the rake face and the second breaker wall protruding upwardly from the first breaker wall at a gentler gradient than that of the first breaker wall are formed in the portion of the breaker wall surface of the chip breaker which faces the nose portion edge, the chips produced in the superfinish cutting are guided along the bottom of the valley defined by the rake face to strike against the first breaker wall which protrudes upwardly from the rake face at a steeper angle than that of the second breaker wall. Therefore, even the chips, which are produced in the superfinish cutting and tend to be more elongate, can be more surely broken into pieces. Further, chips produced in general finish cutting as one mode of universal cutting, where the nose portion edge is used in its entire length, are also forced to strike against the first breaker wall and broken into pieces. On the other hand, since the height of the tip breaker is kept small by the presence of the second breaker wall which protrudes upwardly from the first breaker wall at a gentler gradient than that of the first breaker wall, it is possible to avoid stuffing of relatively thick and wide chips produced in rough cutting. Hence, those chips are also forced to strike against the chip breaker appropriately, whereby they can be bent and surely broken into pieces.

Moreover, since the rake angle of the nose portion edge is set to gradually increase toward the center from both ends of the nose portion edge as described above, both ends of the nose portion edge and the edges continuously joining both ends can be given with a sufficient edge angle and hence tip strength endurable to such a large cut load as being applied in general finish cutting and rough cutting during which the edges in those portions are used. In addition, by setting the rake angle of the nose portion edge to be maximized on the bisector of the nose portion, when a distal end portion of the nose portion edge, i.e., a portion of the nose portion edge lying on the bisector of the nose portion, is mainly used in cutting as experienced in superfinish cutting during which an infeed and/or a feed are small, it is possible to give high sharpness to the distal end portion of the nose portion edge and to achieve good finished surface accuracy.

When the rake angle of the nose portion edge is formed to gradually increase toward the position lying on the bisector of the nose portion from both ends of the nose portion edge, it is preferable that the rake angle of the nose portion edge is set to be in the range of −10° to 30° at both ends of the nose portion edge and in the range of 0° to 40° at the position lying on the bisector. The reasons are as follows. If the rake angle at both ends of the nose portion edge is less than the above range, the edges continuously extending from both ends would also have an insufficient rake angle, thus causing a problem that the cut resistance may increase in universal cutting. On the contrary, if the rake angle at both ends is larger than the above range, the edge angle of the edges would be so small that the edges may be damaged in universal cutting when a large load is applied. If the rake angle of the nose portion edge at the position lying on the bisector is less than the above range, the sharpness of the nose portion edge would deteriorate in the superfinish cutting, making it difficult to achieve good finished surface accuracy. On the contrary, if the rake angle at the position lying on the bisector is larger than the above range, the edge angle of the distal end portion of the nose portion edge would be so small that the nose portion edge may be damaged in the superfinish cutting of hard materials, for example.

As for the breaker wall surface of the chip breaker, gradients or rising angles, at which the first and second breaker walls protrude upwardly, may be set to constant values so that the first and second breaker walls rise linearly in a section taken along the bisector of the nose portion. To make the chips produced in the superfinish cutting more surely broken into pieces, however, it is preferable that the first breaker wall rises following a convexly curved line in a section taken along the bisector. With such a feature, since the first breaker wall is formed to more steeply protrude upwardly from the rake face, the chips produced in superfinish cutting and guided along the rake face can be forced to strike against the first breaker wall and broken into pieces more effectively. As for the second breaker wall, if its rising angle is too small, the height of the chip breaker would be too low, thus causing a problem that the breaking action upon the chips in universal cutting such as rough cutting may be so weak as to impede the chips from being broken into pieces. On the contrary, if the rising angle is too large, the second breaker wall would rise more steeply toward the nose portion edge to make smaller a pocket space defined by the second breaker wall and the nose portion edge, thus causing a problem that stuffing of chips may occur and the chips produced in the universal cutting may be subject to excessive resistance by striking against the second breaker wall, resulting in an increase of the cut resistance. For the above reasons, the rising angle of the second breaker wall is preferably set to be in the range of 1° to 30°.

Thus, with the indexable insert of the present invention described above, since the rake angle of the nose portion edge formed at the nose portion of the rake angle is formed to gradually increase toward the position lying on the bisector of the nose portion from both ends of the nose portion edge, the chips produced by the nose portion edge in superfinish cutting are subject to a bending moment in the widthwise direction at the time of generation thereof, and hence are produced in an easily breakable condition. Those chips are then expelled to be guided to the bottom of the valley defined by a rake face portion continuously extending from the nose portion edge. In addition, at the innermost end of the valley bottom, the first breaker wall constituting the breaker wall surface of the chip breaker is formed to protrude upwardly from the rake face portion at a steep gradient. Therefore, even the chips, which are produced in the superfinish cutting where an infeed and/or a feed is very small, can be quickly broken into pieces and smoothly ejected without having the chip breaker positioned too close to the nose portion edge, or increasing the height or gradient of the breaker wall in its entirety. On the other hand, the tips produced in the general finish cutting are surely broken into pieces by striking against the first breaker wall protruding upwardly steeply. Also, the tips produced in the rough cutting are broken into pieces by the chip breaker, whose height is kept down by forming the second breaker wall to rise gently, without being stuffed. Eventually, it is possible to provide a tip adaptable for a variety of cut conditions covering the range from superfinish cutting to universal cutting.

Another object of the present invention is to provide an indexable insert which can enhance a chip ejection ability and suppress an increase of cut resistance regardless of the depth of cut. To achieve the above object, the present invention provides an indexable insert wherein the tip is in the form of a polygonal plate having a rake face and flank faces, with edges formed along ridges defined at intersections between the rake face and the flank faces, and a breaker formed on the rake face to protrude upwardly from the rake face, the breaker having a wall surface projecting toward nose portions of the rake face at which the edges adjacent to each other intersect, and wherein the wall surface of the breaker projecting toward the nose portions each comprise a first breaker wall rising from the rake face and a second breaker wall continuously extending from the first breaker wall and rising at a gentler gradient than that of the first breaker wall. With such features, the gradient of the second breaker wall which develops the breaking action at a large infeed can be set to be gentle so that the height of the breaker wall in its entirety is kept small, whereas the gradient of the first breaker wall which develops the breaking action at a small infeed can be set to be steep. Therefore, the chips produced at a small infeed are forced to curl and break into pieces by striking against the first breaker wall. Also, the chips produced at a large infeed are likewise broken into pieces by striking against the second breaker wall rising at a gentler gradient than that of the first breaker wall. As a result, the chip ejection ability can be enhanced without increasing the cut resistance over the ranges of both small and large infeeds.

In the indexable insert having the above-described construction, when the first breaker wall and the second breaker wall are both formed to rise linearly in a section taken along the bisector of the nose portion, it is preferable that both the breaker walls are formed to satisfy the following relationships:

$$10° \leq a \leq 60° \text{ and } 1° \leq b \leq 30°$$

where the rising angle of the first breaker wall is a and the rising angle of the second breaker wall is b in the section taken along the bisector. More preferably, the first breaker wall rises following a convexly curved line and the second breaker wall rises linearly in the section taken along the bisector of the nose portion. Then, the first breaker wall and the second breaker wall satisfy the following relationships:

$$10° \leq \alpha, \beta \leq 90° \text{ and } 1° \leq b \leq 30°$$

where the tangential angle of the first breaker wall at an intersection between the rake wall and the first breaker wall is $\alpha$, the tangential angle of the first breaker wall at an intersection between the first breaker wall and the second breaker wall is $\beta$, and the rising angle of the second breaker wall is b in the section taken along the bisector. With such features, in the section taken along the bisector, a steeper wall surface is formed in part of the first breaker wall in comparison with the case where the first breaker wall is formed to rise linearly from the rake face. As a result, a stronger breaking action can be developed by the first breaker wall while the height of the breaker wall in its entirety is held fixed, and the chip ejection ability at a small infeed can be further enhanced.

Alternatively, the indexable insert may be constructed as follows. The first breaker wall is formed to rise linearly and the second breaker wall is formed to rise following a convexly curved line in the section taken along the bisector of the nose portion. Then, the first breaker wall and the second breaker wall are formed to satisfy the following relationships:

$$10° \leq a \leq 60° \text{ and } 0° \leq \alpha, \beta \leq 30°$$

where the rising angle of the first breaker wall is a, the tangential angle of the second breaker wall at an intersection between the first breaker wall and the second breaker wall is $\alpha$, and the tangential angle of the second breaker wall at an upper end of the second breaker wall is $\beta$ in the section taken along the bisector. In this case, a gentler wall surface is formed in part of the second breaker wall in comparison with the case where the second breaker wall is formed to rise linearly from the first breaker wall. Accordingly, the height of the breaker wall in its entirety can be kept small and the breaking action developed by the second breaker wall can be avoided from becoming excessive. As a result, an increase of the cut resistance at a large infeed can be suppressed so that an improvement of the chip ejection ability and a reduction of the cut resistance can both be achieved.

Thus, with the indexable insert of the present invention described above, the chip ejection ability can be enhanced without increasing the cut resistance over the ranges of both small and large infeeds, because the gradient of the second breaker wall which develops the breaking action at a large infeed can be set to be gentle so that the height of the breaker wall in its entirety is kept small, whereas the gradient of the first breaker wall which develops the breaking action at a small infeed can be set to be steep. In particular, when the first breaker wall rises following a convexly curved line and the second breaker wall rises linearly in the section taken along the bisector of the nose portion, a steeper wall surface is formed in part of the first breaker wall in comparison with the case where the first breaker wall is formed to rise linearly from the rake face. Therefore, a stronger breaking action can be developed by the first breaker wall while the height of the breaker wall in its entirety is held fixed, and the chip ejection ability at a small infeed can be further enhanced. On the other hand, when the first breaker wall is formed to rise linearly and the second breaker wall is formed to rise following a convexly curved line in the section taken along the bisector of the nose portion, a gentler wall surface is formed in part of the second breaker wall in comparison with the case where the second breaker wall is formed to rise linearly from the first breaker wall. Therefore, the height of the breaker wall in its entirety can be kept small and the breaking action developed by the second breaker wall can be avoided from becoming excessive. As a result, an increase of the cut resistance at a large infeed can be suppressed so that an improvement of the chip ejection ability and a reduction of the cut resistance can be both achieved.

DESCRIPTION OF THE PREFERRED EMBODIMENTS

Figure 1:
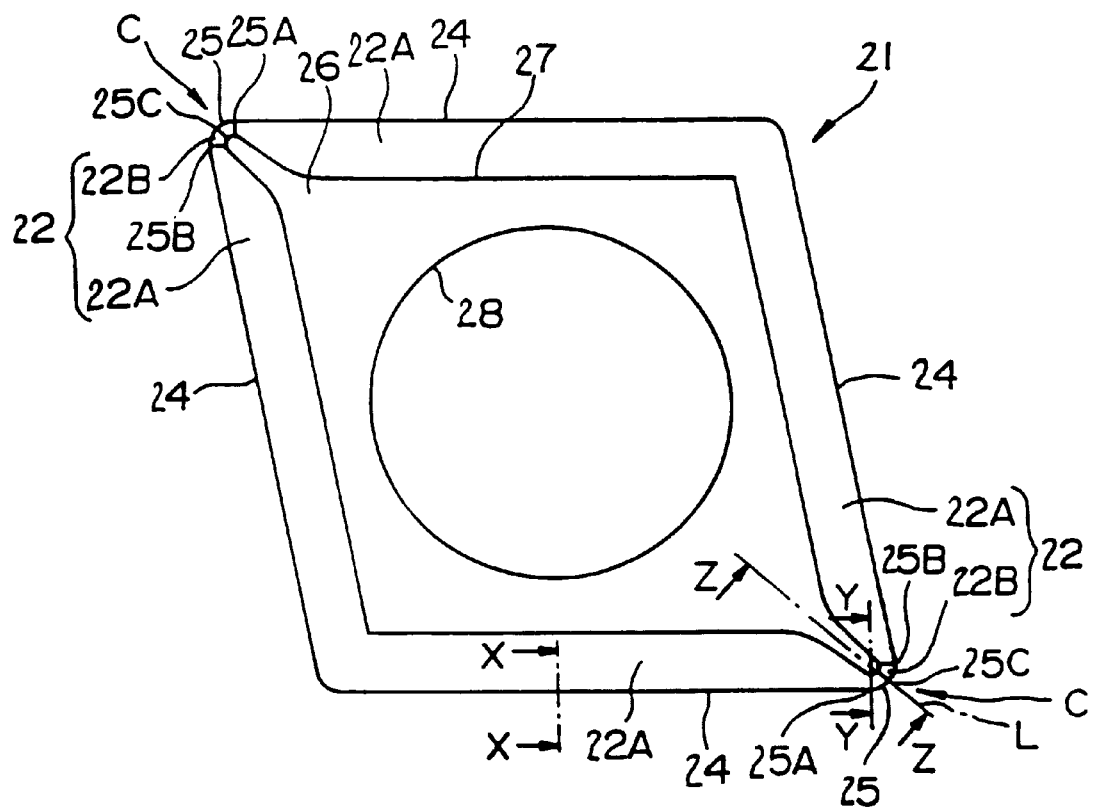
FIG. 1 is a plan view showing an indexable insert according to a first embodiment of the present invention.

FIGS. 1 to 6 show a first embodiment of the present invention. In an indexable insert of the first embodiment, a tip body 21 is formed of a flat plate which is made of hard materials such as solid carbide and is substantially rhombic in plan. An upper surface of the tip body 21 serves as a rake face 22, and lateral surfaces of the tip body 21 each serve as a flank face 23. An edge 24 is formed along the ridge defined at an intersection between the rake face 22 and each flank face 23. At two of the four corners C, C of the rake face 22 where the edges 24 adjacent to each other intersect at an acute angle, convexly arc-shaped nose portion edges 25 are formed in a smooth continuous relationship to the edges 24 on both sides. In this embodiment, the edges 24 and the nose portion edges 25 are formed on one plane lying vertically to a direction of thickness of the tip body 21 in the form of a flat plate. Also, the indexable insert of this embodiment is constructed as a positive tip in which the flank faces 23 are inclined inwardly as they approach a lower surface of the tip body 21 so that the flank faces 23 are previously given with a clearance angle with respect to the edges 24 and the nose portion edges 25.

Figure 4:
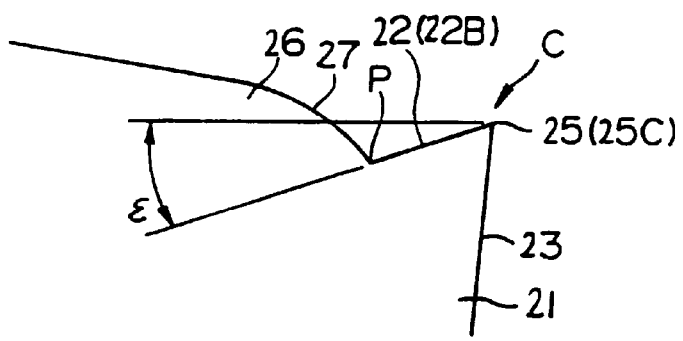
FIG. 4 is a sectional view taken at 4–4 in FIG. 1.
Figure 5:
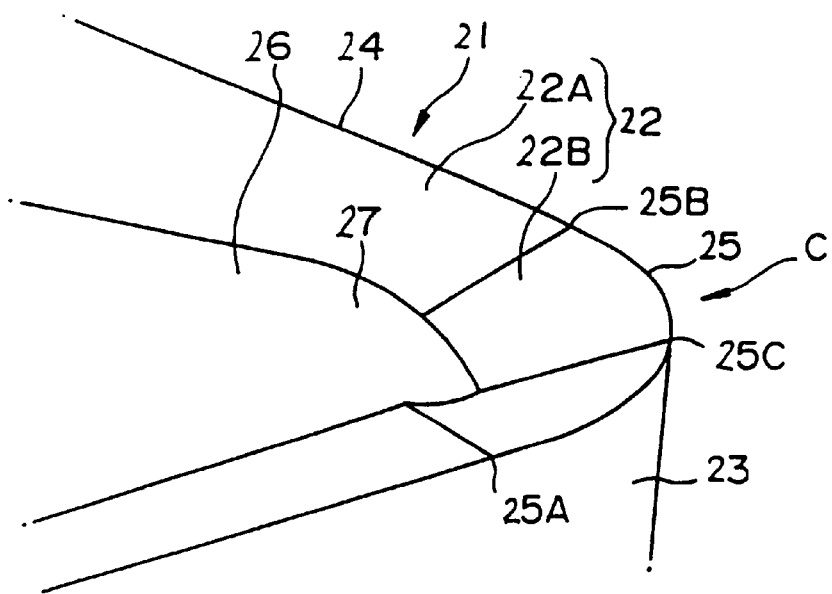
FIG. 5 is a perspective view showing an area around one corner C of a rake face 22 in the embodiment shown in FIG. 1.

In an inner area of the rake face 22, a chip breaker 26 is formed to protrude upwardly from the rake face 22 with gaps left from the edges 24 and the nose portion edges 25. The chip breaker 26 is formed, as shown in FIG. 1, such that it has a breaker wall surface 27 formed to have a rhombic shape and a size smaller than the rake face 22 inwardly of the edges 24 in a plan view looking in a direction facing the rake face 22 with a large gap left from the edges 24. At the corners C, C adjacent to the nose portion edges 25, it extends in the form of ribs in the diagonal direction connecting the corners C, C so as to terminate in positions close to the nose portion edges 25 with small gaps left between its fore ends and the nose portion edges 25. In this embodiment, each portion of the chip breaker 26 extending in the form of a rib along the diagonal connecting the corners C, C is formed to protrude upwardly from the rake face 22 in the form of a half circle in a section perpendicular to that diagonal, and each fore end of the chip breaker 26 is shaped into the form of substantially one quarter of a sphere as shown in FIGS. 1 and 4. Incidentally, an attachment hole 28, in which is inserted a clamp screw or the like used for attaching the tip body 21 to a cutting tool such as a bite, is formed through the tip body 21 from the center of the rake face 22 to the lower surface of the tip body 21.

Figure 2:
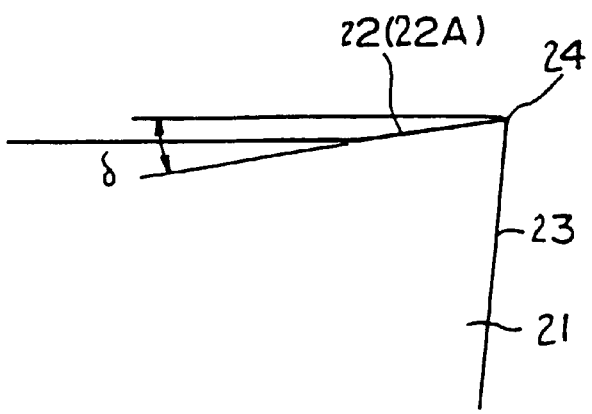
FIG. 2 is a sectional view taken at 2–2 in FIG. 1.
Figure 3:
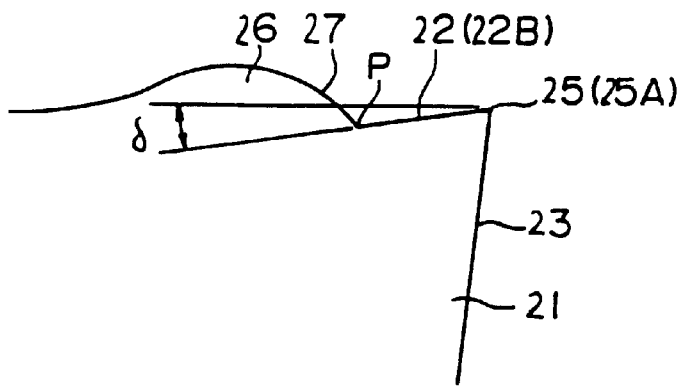
FIG. 3 is a sectional view taken at 3–3 in FIG. 1.

Further, in this embodiment, a portion 22A of the rake face 22 which extends continuously from each of the edges 24 is formed as a slope gradually recessed at a certain gradient in a section perpendicular to the edge 24 toward the inner side of the tip body 21 away from the edge 24, as shown in FIG. 2, such that the edges 24 have a certain rake angle δ over the entire length thereof. On the other hand, a sector-shaped portion 22B of the rake face 22 which extends continuously from each of the nose portion edges 25 is formed such that the rake angle is varied with respect to the nose portion edge 25 between both ends 25A, 25B of the nose portion edge 25. More specifically, in this embodiment, the rake angle of the nose portion edge 25 is set to the same value as the rake angle δ of the edge 24 at both ends 25A, 25B of the nose portion edge 25, and gradually increases with an increase of distance from both ends 25A, 25B to have a larger value than the rake angle δ in an intermediate area between both ends 25A, 25B. Especially, in this embodiment, the rake angle of the nose portion edge 25 is set to exhibit a maximum angle ε at a position lying on a bisector L of the corner C, i.e., in a position of the center 25C of the nose portion edge 25 where a line L bisecting a cross angle, which is formed by the edges 24 continuously extends from both ends 25A, 25B of the nose portion edge 25, intersects the nose portion edge 25 as viewed in the direction facing the rake face 22.

When the indexable insert thus constructed is employed to perform rough cutting during which an infeed and/or a feed is relatively large and an area extending from the nose portion edge 25 to the edge 24 is used, most of chips are produced by the edge 24 and the produced chips are broken into pieces in such a manner that they are subject to resistance and bent while sliding over the rake face portion 22A which extends continuously from the edge 24, and are then broken upon striking against the chip breaker 26. Also, when the indexable insert is employed to perform ordinary finish cutting during which an infeed and/or a feed is smaller than in the above case of rough cutting and almost the entire length of the nose portion edge 25 is used, chips are quickly broken into pieces because they strike against the fore end of the chip breaker 26 terminating in the position close to the corresponding nose portion edge 15 immediately after being produced.

Figure 6:
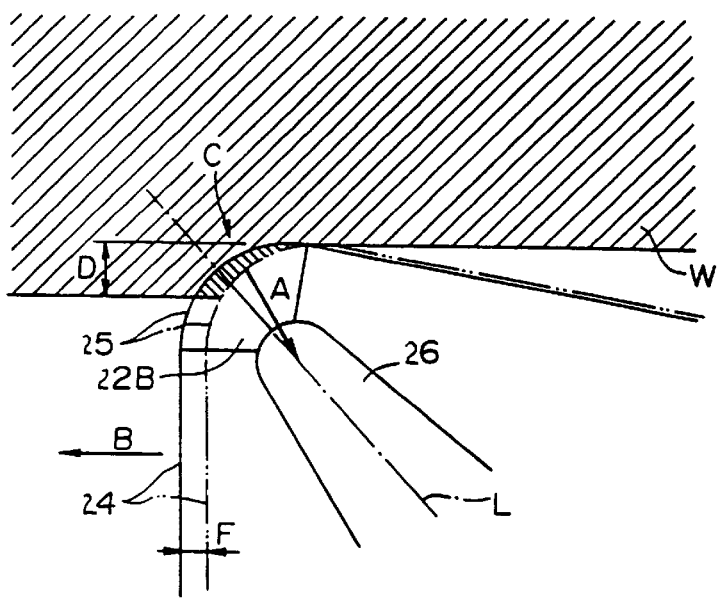
FIG. 6 is a plan view showing the case where superfinish cutting is performed with the indexable insert according to the embodiment shown in FIG. 1.
Figure 7:
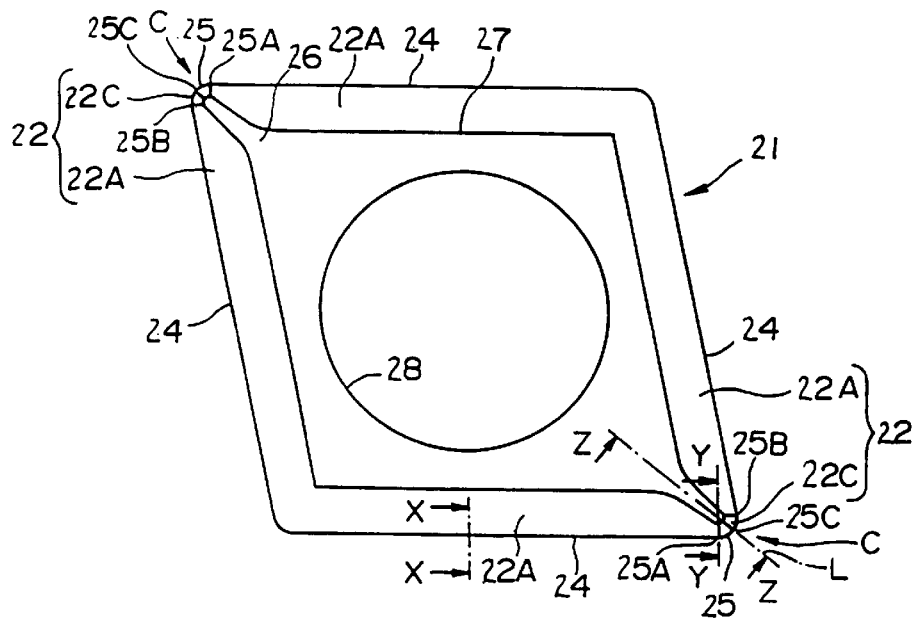
FIG. 7 is a plan view showing an indexable insert according to a second embodiment of the present invention.
Figure 8:
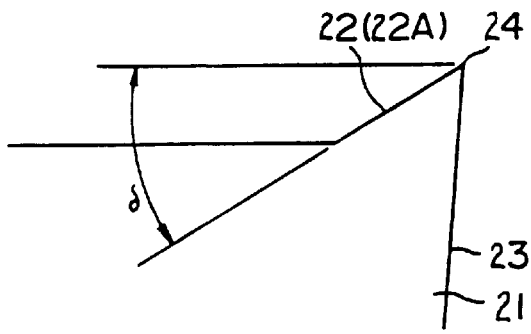
FIG. 8 is a sectional view taken at 8–8 in FIG. 7.
Figure 9:
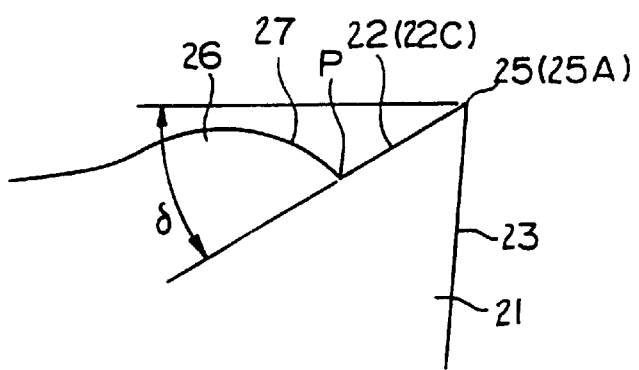
FIG. 9 is a sectional view taken at 9–9 in FIG. 7.
Figure 10:
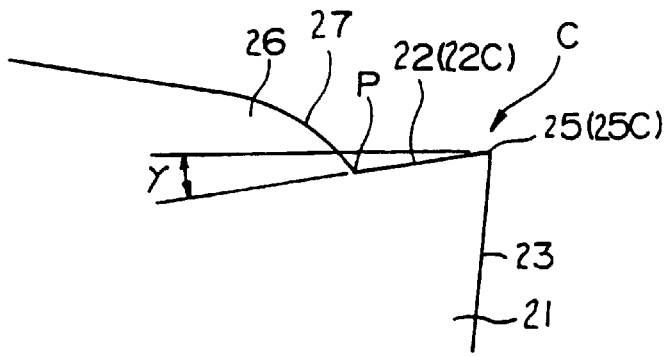
FIG. 10 is a sectional view taken at 10–10 in FIG. 7.

On the other hand, when the indexable insert is employed to perform superfinish cutting during which an infeed and/or a feed is even smaller than in the case of ordinary finish cutting, only part of the nose portion edge 25 is used, as shown in FIG. 6, and chips which are very thin and have a small width are produced. Because of the indexable insert having such a construction that the rake angle of the nose portion edge 25 varies between both ends 25A, 25B of the nose portion edge 25 as described above, the chips produced by the nose portion edge 25 are subject to a bending moment in the widthwise direction at the time of generation thereof, and are expelled in the lengthwise direction, i.e., outgoing direction A, in an easily breakable condition. Note that, in FIG. 6, reference character W represents a material to be cut (workpiece), B represents a direction of feed of the cutting tool to which the indexable insert is attached, D represents an infeed set in the superfinish cutting, and F represents a feed of the cutting tool per revolution of the material W to be cut.

With the indexable insert having the above-described construction, the chips produced in the easily breakable condition are subject to resistance in the longitudinal direction and bent while sliding over the rake face portion 22B, or they strike against the fore end of the chip breaker 26 positioned at the innermost end of the rake face portion 22B. Hence, even chips which are thin and have a small width can be easily broken into pieces. In the case of superfinish cutting, therefore, efficient chip ejection can also be achieved without the need to position the fore end of the chip breaker 26 too close to the nose portion edge 25. Accordingly, the chip breaker 26 can be formed in the same position as that of the conventional indexable insert adapted for universal cutting. This means that stuffing of chips is avoided and good chip ejection efficiency can be maintained when the indexable insert of this embodiment is employed to perform not only general finish cutting, but also rough cutting during which thick and wide chips are produced. Further, since an increase of the cut resistance caused by stuffing of chips is suppressed and the resulting vibration is prevented, it is possible to avoid the deterioration of the finished surface accuracy and shortening of the tip life. In addition, the indexable insert can be avoided from breaking at a recessed inflecting point P where the breaker wall surface 27 intersects the rake face portion 22B. As a result, an indexable insert having high versatility, which is applicable to universal cutting ranging from superfinish cutting to general finish cutting and further to rough cutting, can be provided.

Moreover, in this embodiment, the rake angle of the nose portion edge 25 is varied such that the intermediate area of the nose portion edge 25 has a larger rake angle than at both ends 25A, 25B thereof, while a large edge angle is given at both ends 25A, 25B of the nose portion edge 25 and the edges 24 extend continuously from both ends 25A, 25B. This construction enables the indexable insert to have sufficient tip strength to endure such a large cut load as is applied in general finish cutting and rough cutting during which both ends 25A, 25B of the nose portion edge 25 and the edges 24 are used. Also, with the above-described construction, the rake surface portion 22B continuously extending from the nose portion edge 25 has the form of a valley that is sloped downwardly in the intermediate area of the nose portion edge 25 toward the bisector L from both ends 25A, 25B along the nose portion edge 25. Therefore, the chips produced in superfinish cutting, particularly, are expelled to run along the valley defined by the rake face portion 22B toward the valley bottom, where they are bent by the rake face portion 22B which is V-shaped with the valley bottom lying at the center, or are guided along the valley bottom so as to strike against the fore end of the chip breaker 26 which is positioned at the innermost end of the rake face portion 22B. As a result, those chips can be more surely broken into pieces.

Further, in this embodiment, the rake angle of the nose portion edge 25 is set to exhibit a maximum angle ε at the position lying on the bisector L of the corner C of the rake face 22 in which the nose portion edge 25 is formed, i.e., in the position of the center 25C of the nose portion edge 25. Here, in the nose portion edge 25 convexly arc-shaped as with this embodiment, an area around the center 25C of the nose portion edge 25 provides a distal end portion of the nose portion edge 25, and hence the area around the center 25C of the nose portion edge 25 is used in superfinish cutting or the like. With this embodiment, therefore, the nose portion edge 25 can have high sharpness, particularly, in the area around the center 25C of the nose portion edge 25, and better finished surface accuracy can be obtained. Still another advantage is that since the bottom of the valley defined by rake face portion 22B continuously extending from the nose portion edge 25 extends along the bisector L inward from the center 25C of the nose portion edge 25, the chips produced by the center 25C can be more surely guided along the valley bottom and quickly broken into pieces.

Next, FIGS. 7 to 11 show a second embodiment of the present invention. Components common to those in the above first embodiment are denoted by the same reference numerals and a description thereof is omitted here. In this embodiment, the rake angle of the nose portion edge 25 is varied between both ends 25A, 25B of the nose portion edge 25 as follows. The rake angle of the nose portion edge 25 is set to the same value as the rake angle δ of the edge 24 at both ends 25A, 25B of the nose portion edge 25, and to gradually decrease with an increase of distance from both the ends 25A, 25B so as to have a smaller value than the rake angle δ in the intermediate area between both ends 25A, 25B. Especially, in this embodiment, the rake angle of the nose portion edge 25 is set to exhibit a minimum angle γ at the position lying on the bisector L of the corner C, i.e., in the position of the center 25C of the nose portion edge 25 where the line L bisecting the cross angle, which is formed by the edges 24 continuously extending from both ends 25A, 25B of the nose portion edge 25, intersects the nose portion edge 25 as viewed in the direction facing the rake face 22.

With the indexable insert thus constructed, since the rake angle of the nose portion edge 25 is varied between both ends 25A, 25B of the nose portion edge 25 as described above, the chips produced by the nose portion edge 25 are subject to a bending moment in the widthwise direction, and are expelled in an easily breakable condition. Hence, even in superfinish cutting during which chips which are thin and have a small width are produced, reliable chip ejection can be achieved without positioning the fore end of the chip breaker 26 too close to the nose portion edge 25. Eventually, an indexable insert having high versatility, which is applicable to universal cutting including rough cutting, can be provided. Also, in this embodiment, a sector-shaped portion 22C of the rake face 22 which continuously extends from the nose portion edge 25 protrudes thereof in the form of a hill rising from both ends 25A, 25B toward the bisector L in the intermediate area between both the ends 25A, 25B along the nose portion edge 25. The chips produced by the nose portion edge 25 are subject to resistance and are bent by being pressed against a slope of the hill while sliding over the rake face portion 22C. As a result, similarly to the above first embodiment, the chips can be more reliably broken into pieces.

Figure 11:
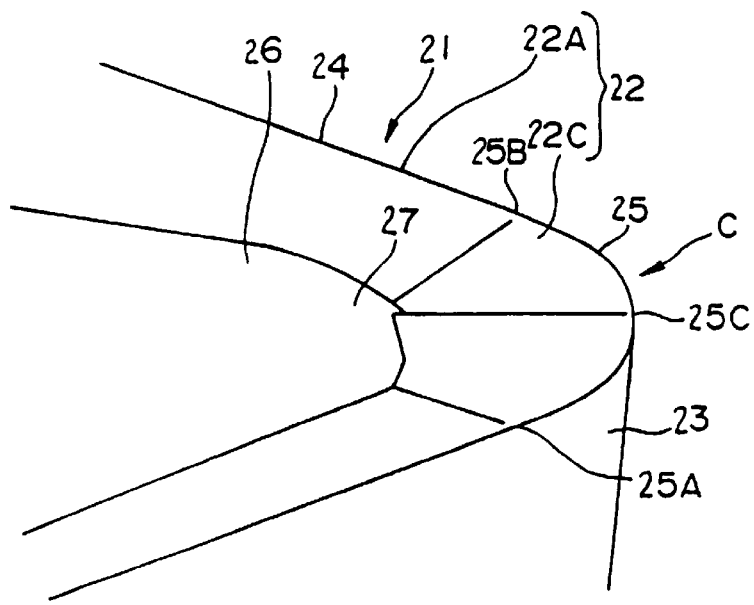
FIG. 11 is a perspective view showing an area around one corner C of a rake face 22 in the embodiment shown in FIG. 7.

Further, in this embodiment, since the rake angle of the nose portion edge 25 is set to exhibit the minimum angle γ on the bisector L of the corner C, i.e., at the center 25C of the nose portion edge 25 which serves as the distal edge end used in superfinish cutting, the center 25C of the nose portion edge 25 can be given sufficient tip strength. Therefore, even when superfinish cutting is performed on a workpiece made of hard materials, for example, the nose portion edge 25 will not be damaged. Also, because of the construction that the nose portion edge 25 has the minimum rake angle γ on the bisector L of the corner C, the rake face portion 22C which continuously extends from the nose portion edge 25 protrudes in the form of a hill with its ridge lying on the bisector L, as shown in FIG. 11. Accordingly, the chips produced by the area around the center 25C of the nose portion edge 25 in superfinish cutting are subject to resistance and bent while sliding over the rake face portion 22C along the hill ridge, or if deviated from the hill ridge, those chips are subject to resistance and bent by being pressed against a slope of the hill defined by the rake face portion 22C. As a result, the chips can be more reliably broken into pieces.

While, in the above first and second embodiments, the rake face portion 22B, 22C, which is located between both ends 25A, 25B of the nose portion edge 25 and in which the rake angle is varied with respect to the nose portion edge 25, extends so as to straightly reach the nose portion edge 25, a land may be formed in the rake face portion 22B, 22C on the side near the nose portion edge 25. In that case, the land may be a negative or positive land. Also, the indexable inserts of the above first and second embodiments are both positive tips, but they may be negative tips. Further, in the above first and second embodiments, the rake angle δ of the edge 24 and the rake angles δ, ε, γ of the nose portion edge 25 are all set to positive angles. However, those rake angles may be set to negative angles so long as δ≦ε is satisfied in the first embodiment and δ>γ is satisfied in the second embodiment. Additionally, the rake angle of the nose portion edge 25 may be set to vary between a positive angle and a negative angle.

Moreover, in each of the indexable inserts of the above embodiments, the edges 24 and the nose portion edges 25 are positioned in one plane lying vertically to the direction of thickness of the tip body 21, and hence all those edges lie in a straight line in a side view, i.e., looking in a direction vertical to the flank faces 23 of the tip body 21. However, the edges 24 and the nose portion edges 25 may curve in the direction of thickness of the tip body 21 so that those edges lie on a curved line in a side view. Also, the edges 24 may be formed to curve in the plan view looking in the direction facing the rake face 22 of the tip body 21, whereas the nose portion edges 25 may be formed at the so-called chamfered corner which is defined by a straight line in plan.

Further, in the above first and second embodiments, the rake angle of the nose portion edge 25 is set to be larger or smaller in the intermediate area between both ends 25A, 25B thereof than at both ends 25A, 25B, and particularly it is set to have a maximum or minimum value at the center 25C of the nose portion edge 25 lying on the bisector L of the corner C. As an alternative example, however, the rake angle of the nose portion edge 25 may be set to have a maximum or minimum value in a position offset from the center 25C of the nose portion edge 25 toward one of both ends 25A, 25B, or it may be set to gradually increase or decrease in a direction from one of both ends 25A, 25B toward the other. Such a modification is especially effective in the case where the orientations of the edges 24 and the nose portion edges 25, which are used in cutting, are limited to specific directions beforehand. Additionally, in the above first and second embodiments, the rake angle of the nose portion edge 25 is set to vary in the intermediate area between both ends 25A, 25B in such a manner as to gradually increase or decrease toward the center 25C of the nose portion edge 25 and then gradually decrease or increase after passing the center 25C. However, the rake angle of the nose portion edge 25 may be set to vary in the intermediate area between both ends 25A, 25B in such a manner as to increase and decrease repeatedly.

A chip ejection ability was examined on the indexable insert of the first embodiment shown in FIGS. 1 to 6 and the indexable insert of the second embodiment shown in FIGS. 7 to 11 by carrying out cutting while an infeed and a feed were changed. As a comparative example, cutting was carried out with the indexable insert shown in FIGS. 28 to 31 under the same cutting conditions for comparison of the chip ejection ability. A workpiece used in the measurement was an S45C material (carbon steel for mechanical structures) and the cutting speed was 200 m/min. The indexable inserts used were all made of solid carbide and had the same size. The nose radius of the nose portion edge 15, 25 was 0.4 mm, the distance from the center (distal end) of the nose portion edge 15, 25 to the fore end of the chip breaker 16, 26 was 1.3 mm, the distance from the edge 14, 24 to the breaker wall surface 17, 27 of the chip breaker 16, 26 was 1.1 mm, the cross angle at which the edges 14, 24 intersect to each other at the corner C was 80°, and the clearance angle of the flank face 13, 23 was 8°. Further, the rake angle θ of the indexable insert of the comparative example was 8°, whereas the rake angles δ, ε of the indexable insert of the first embodiment were respectively 8°, 18° and the rake angles δ, γ of the indexable insert of the second embodiment were respectively 8°, 0°.

Figure 12:
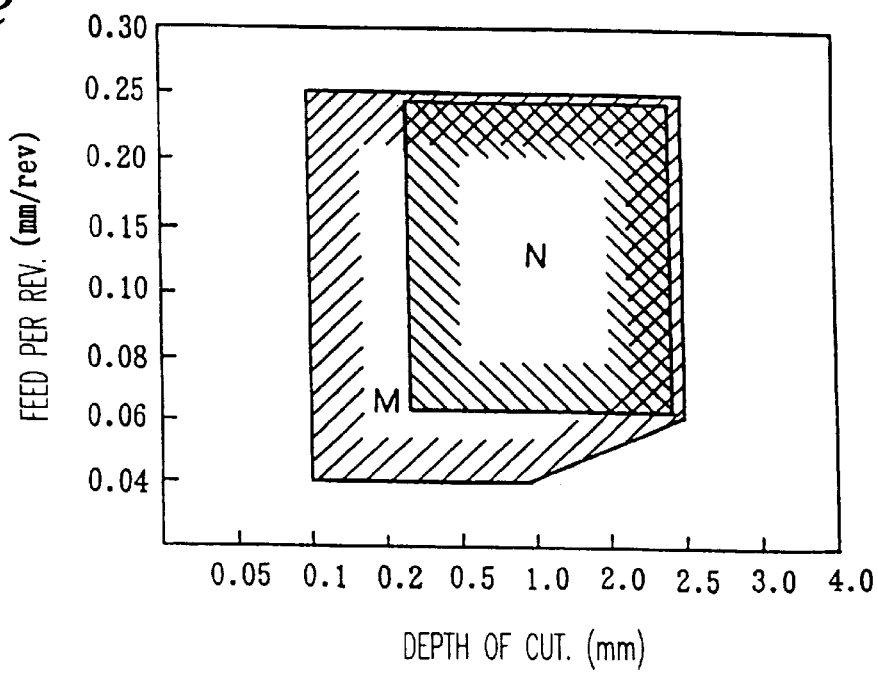
FIG. 12 is a graph schematically showing chip ejection abilities resulting when cutting is made with the indexable inserts according to the embodiments of the present invention and a conventionally proposed indexable insert as a comparative example.

As a result of the measurement, it was found that a good chip ejection ability was obtained with any of the indexable inserts of the first and second embodiments in substantially the same ranges of infeed and feed in a variety of cutting from rough cutting and ordinary finish cutting to superfinish cutting during which an infeed and/or a feed was very small. On the other hand, with the indexable insert of the comparative example, a chip ejection ability comparable to that obtained with the indexable inserts of the embodiments was obtained in the rough cutting and the ordinary finish cutting during which an infeed and/or a feed was relatively large. However, when an infeed and/or a feed was set to a very small value, chips were expelled to run out without being broken into pieces, and became entangled with the cutting tool, causing trouble in the cutting work. The obtained results are illustrated in FIG. 12 as ranges of infeed and feed in which chips can be surely ejected. In FIG. 12, reference character M represents the indexable inserts of the above first and second embodiments, and N represents the indexable insert of the comparative example.

Next, FIGS. 13 to 19 show a third embodiment of the present invention. In an indexable insert of the third embodiment, a tip body 31 is formed of a flat plate which is made of hard materials such as solid carbide and is substantially rhombic in plan. An upper surface of the tip body 31 serves as a rake face 32, and lateral surfaces of the tip body 31 each serve as a flank face 33. An edge 34 is formed along the ridge defined at an intersection between the rake face 32 and each flank face 33. At four corners or nose portions C of the rake face 32 where the edges 34 adjacent to each other intersect, convexly arc-shaped nose portion edges 35 are formed in a smooth continuous relationship to the edges 34 on both sides. In this embodiment, the edges 34 and the nose portion edges 35 are formed positioned on one plane lying vertically to a direction of thickness of the tip body 31 in the form of a flat plate.

Figure 13:
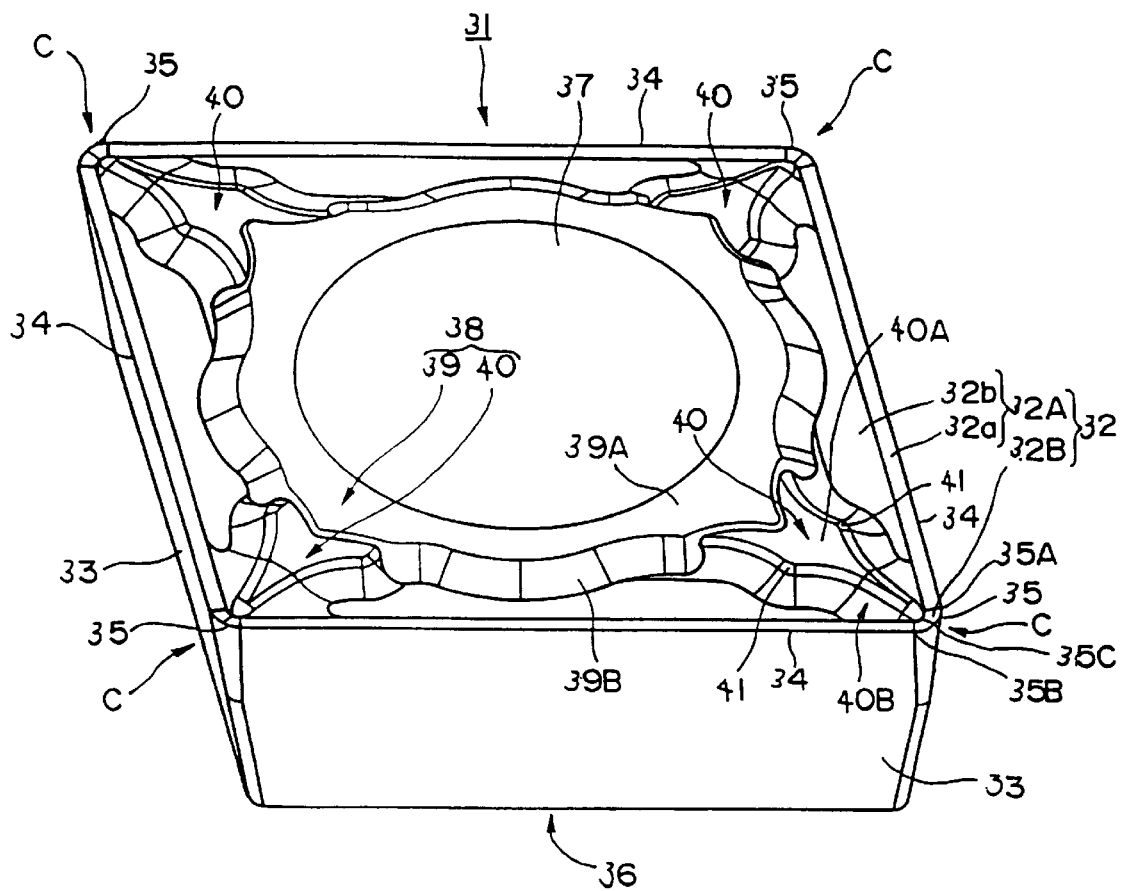
FIG. 13 is a plan view showing an indexable insert according to a third embodiment of the present invention.
Figure 14:
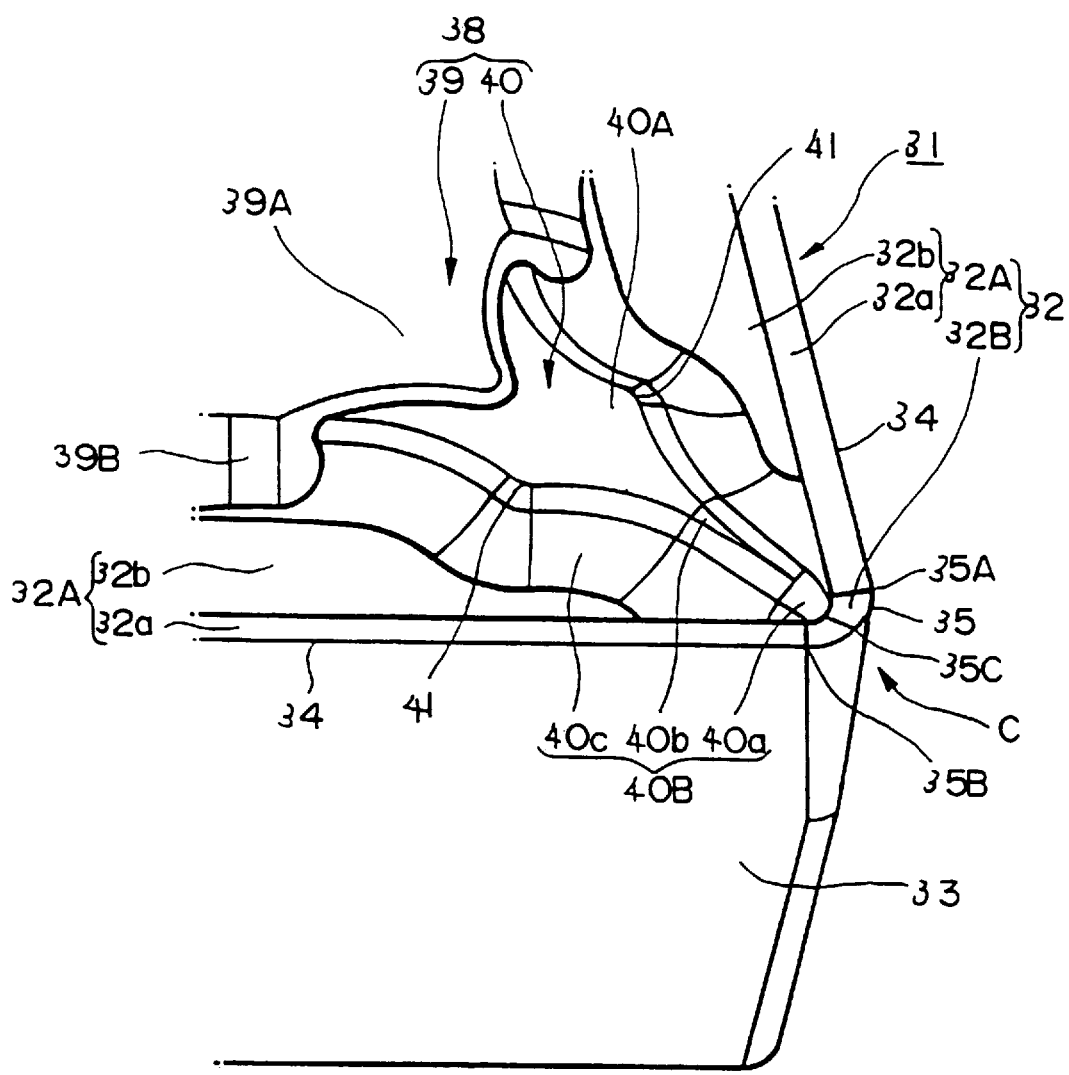
FIG. 14 is an enlarged perspective view of an area around a nose portion C of the indexable insert according to the embodiment shown in FIG. 13.
Figure 15:
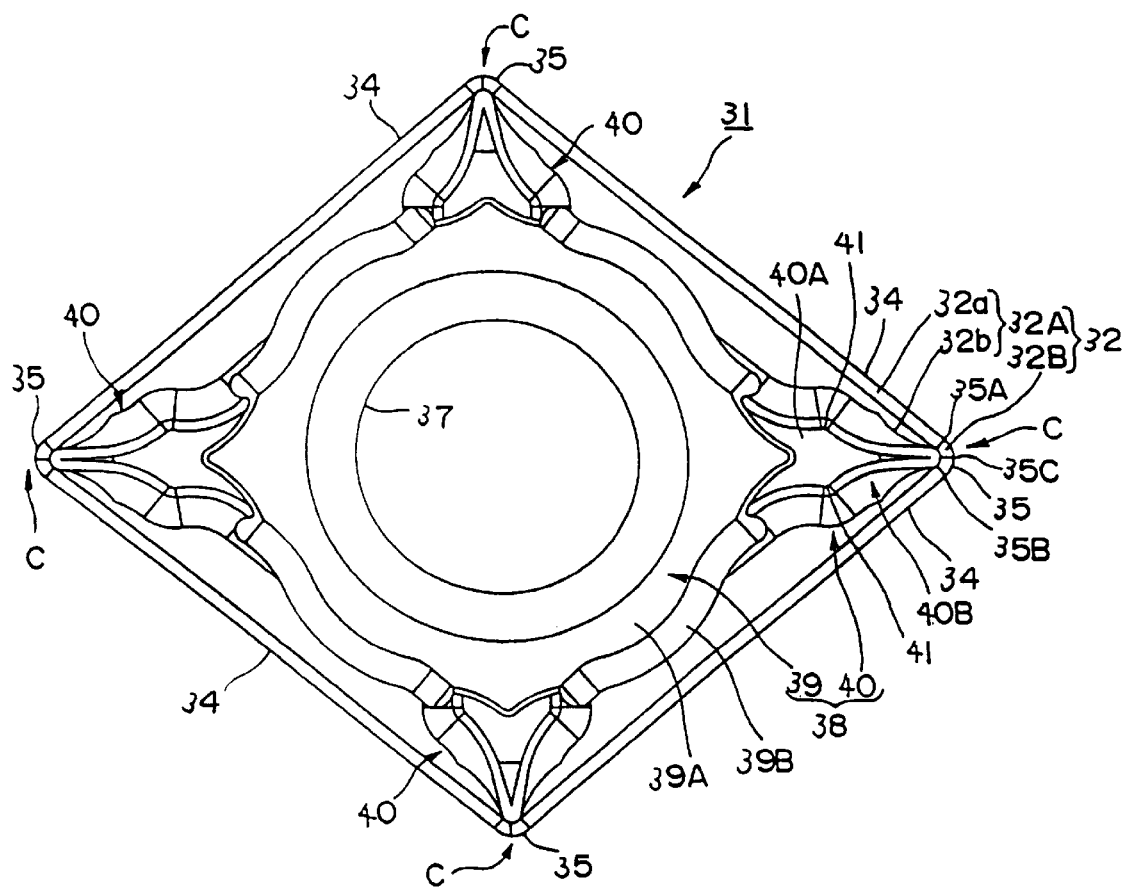
FIG. 15 is a plan view of the indexable insert according to the embodiment shown in FIG. 13.

Also, the indexable insert of this embodiment is constructed as a positive tip in which the flank faces 33 are inclined inwardly as they approach a lower surface 36 of the tip body 31 so that the flank faces 33 are previously given with a clearance angle with respect to the edges 34 and the nose portion edges 25. Specifically, in this embodiment, a portion of the flank face 33 which continuously extends from the edge 34 is inclined at a constant clearance angle throughout the tip body 31 in the direction of thickness thereof, as shown in FIG. 13. An attachment hole 37, in which is inserted a clamp screw or the like used for attaching the tip body 31 to a cutting tool such as a bite, is formed through the tip body 31 from the center of the rake face 32 to the lower surface 36 of the tip body 31.

Further, in this embodiment, a portion 32A of the rake face 32 which continuously extends from each of the edges 34 consists of a first rake face 32a formed in a certain width along the edge 34 and sloped downwardly at a certain gradient in the direction of thickness of the tip body 31 with an increase of distance from the edge 34, and a second rake face 32b continuously extending inwardly from the first rake face 32a in a direction vertical to the direction of thickness of the tip body 31. The edges 34 therefore have a certain rake angle δ over the entire length thereof by the first rake faces 32a. In this embodiment, since the first rake face 32a is sloped downwardly at a certain gradient in the direction of thickness of the tip body 31 as described above, the rake angle δ of the edge 34 is provided as a positive angle. Alternatively, the rake angle δ of the edge 34 may be set to a negative angle by forming the first rake face 32a so as to protrude upwardly in the direction of thickness of the tip body 31 with an increase of distance from the edge 34. In this connection, the rake angle δ of the edge 34 is preferably set to be in the range of −10° to 30°.

On the other hand, a sector-shaped portion 32B of the rake face 32 which is continuously extends from each of the nose portion edges 35 is formed such that the rake angle is varied with respect to the nose portion edge 35 between both ends 35A, 35B of the nose portion edge 35. More specifically, in this embodiment, the rake angle of the nose portion edge 35 is set to the same value as the rake angle δ of the edges 34 at both ends 35A, 35B of the nose portion edge 35, and gradually increases with an increase of distance from both the ends 35A, 35B to exhibit a maximum angle ε at a position lying on a bisector L of the nose portion C, i.e., in a position of the center 35C of the nose portion edge 35 where a line L bisecting a cross angle, which is formed by the edges 34 continuously extends from both ends 35A, 35B of the nose portion edge 35, intersects the nose portion edge 35 as viewed in the direction of thickness of the tip body 31, i.e., in the direction facing the rake face 32. Note that the maximum rake angle ε of the nose portion edge 35 is set to a positive angle larger than the rake angle δ and is preferably set to be in the range of 0° to 40°.

On the rake face 32 of the tip body 31, a chip breaker 38 is formed to protrude upwardly from the rake face 32 with gaps left from the edges 34 and the nose portion edges 35. More specifically, the chip breaker 38 is formed inside the first rake faces 32a of the rake face portions 32A continuously extending from the edges 34 and the rake face portions 32B continuously extending from the nose portion edges 35, and protrudes in the direction of thickness of the tip body 31 from the second rake face 32b of the rake face portion 32A which lies vertically to the direction of thickness of the tip body 31. In this embodiment, the chip breaker 38 consists of an annular portion 39 in the form of substantially a ring positioned around the attachment hole 37, and four rib portions 40 extending radially from an outer periphery of the annular portion 39 toward the nose portions C along diagonals of the rhombic rake face 32. An upper surface 39A of the annular portion 39 is formed as a flat surface lying vertically to the direction of thickness of the tip body 31 and protruding upwardly beyond the edges 24, the nose portion edges 25 and the rib portions 40 in the direction of thickness of the tip body 31. Additionally, a breaker wall surface 39B located along the outer periphery of the annular portion 39 is formed as a slope gradually descending radially outward.

Figure 16:
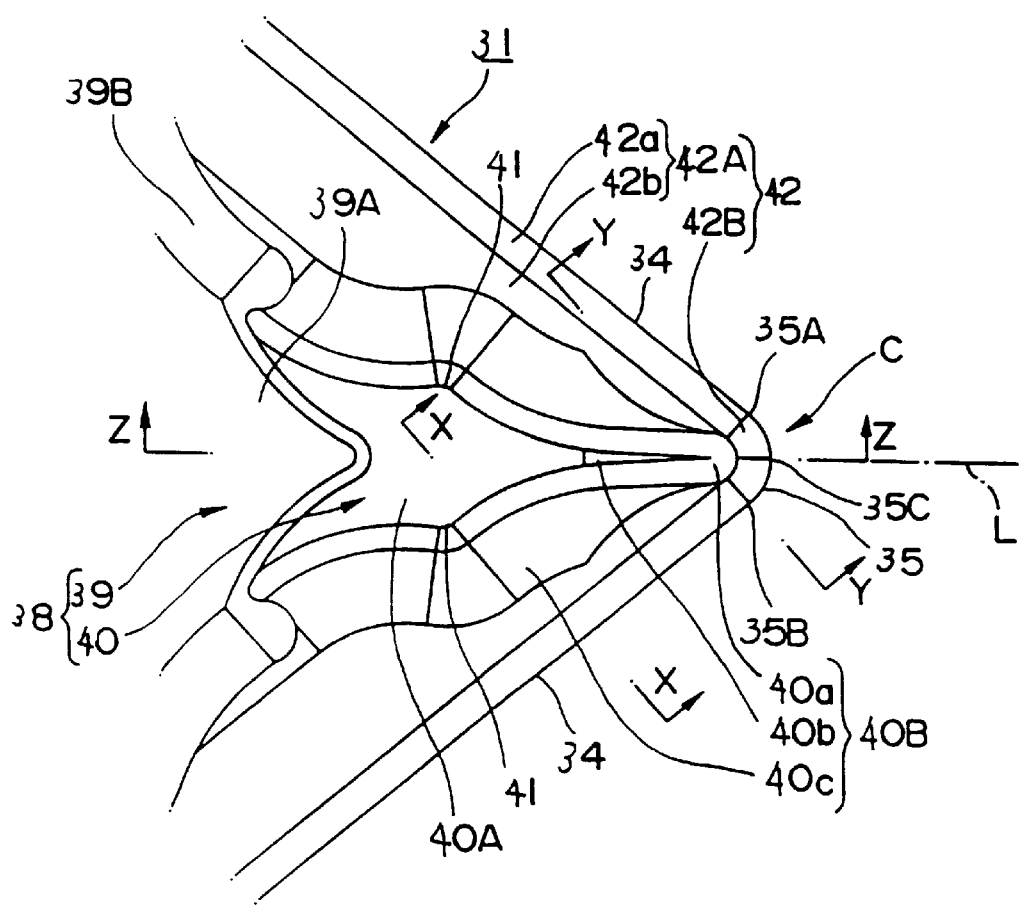
FIG. 16 is an enlarged plan view of the area around the nose portion C of the indexable insert according to the embodiment shown in FIG. 13.
Figure 17:
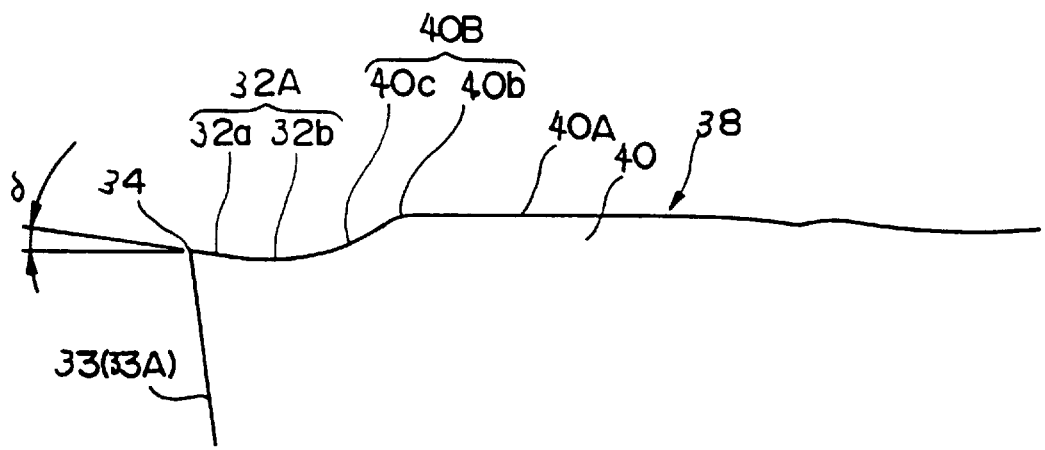
FIG. 17 is a sectional view taken at 17–17 in FIG. 16.
Figure 18:
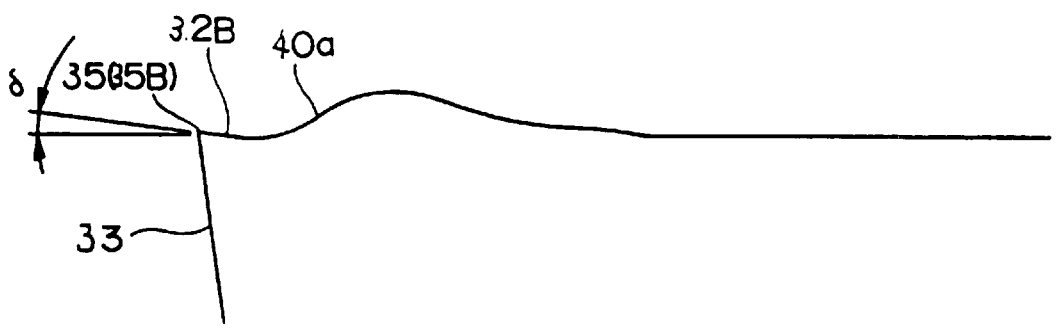
FIG. 18 is a sectional view taken at 18–18 in FIG. 16.

As best shown in FIG. 16, the rib portions 40 of the chip breaker 38 are each formed to gradually narrow in width as a whole toward the corresponding nose portion C in a plan view looking in the direction facing the rake face 32. The rib portion 40 consists of, similar to the annular portion 39, an upper surface 40A lying vertically to the direction of thickness of the tip body 31, and a breaker wall surface 40B gradually descending radially outwardly from a peripheral edge of the upper surface 40A. Further, the breaker wall surface 40B is formed along each of the outer lateral sides of the upper surface 40A. The breaker wall surface 40B consists of a first breaker wall 40a extending toward the nose portion C in an area facing the nose portion C so as to continuously join with the rake face portion 32B of the nose portion edge 35; a second breaker wall 40b formed adjacent to the upper surface 40A on the side nearer to the nose portion C to position between the upper surface 40A and the first breaker wall 40*a*; and a third breaker wall 40*c* extending from each of the outer lateral edges of the first breaker wall 40*a* to the second rake face 32*b*.

Here, the first breaker wall 40*a* is formed to extend vertically to the direction of thickness of the tip body 31 in its part aligned with the upper surface 40A, and to slope gradually downwardly toward the nose portion C in its part facing the nose portion C. Also, the first breaker wall 40*a* is formed such that, in the plan view looking in the direction facing the rake face 32, it has a V-shape defined by both the lateral edges of the upper surface 40A which intersect at a small included angle at a distal end adjacent to the nose portion C. Further, in this embodiment, the first breaker wall 40*a* is formed into such an arcuate shape as to be smoothly contiguous with the upper surface 40A, the second breaker wall 40*b* and the third breaker wall 40*c* in a section perpendicular to a direction in which the first breaker wall 40*a* is extended. In particular, the distal end of the first breaker wall 40*a* facing the nose portion C is formed into a spherical shape protruding upwardly from the rake face portion 32B of the nose portion edge 35. On the other hand, the second breaker wall 40*b* is formed, in the plan view looking in the direction facing the rake face 32, into a shape of an isosceles triangle that is located between two sides of the V-shaped part of the first breaker wall 40*a* facing the nose portion C and is tapered toward the nose portion C. Also, the second breaker wall 40*b* is formed as a flat slope which intersects the upper surface 40A at an obtuse angle and gradually descends toward the nose portion C at the same gradient as that of the part of the first breaker wall 40*a* facing the nose portion C.

With the first and second breaker walls 40*a*, 40*b* formed as described above, in a section taken along the bisector L of the nose portion C, the area of the breaker wall surface 40B facing the nose portion C first protrudes upwardly at a steep gradient in a convexly curved shape by the presence of the first breaker wall 40*a* toward the inner side of the tip body 31 from the rake face portion 32B continuously extending from the nose portion edge 35, then smoothly extends from the above convexly curved shape and linearly protrudes from the first breaker wall 40*a* at a gentler gradient than that of the first breaker wall 40*a* after entering the second breaker wall 40*b*, and then reaches the flat upper surface 40A of the rib portion 40 of the chip breaker 38. Here, a rising angle φ of the second breaker wall 40*b* at the position lying on the bisector L is preferably set to be in the range of 1° to 30°.

Figure 19:
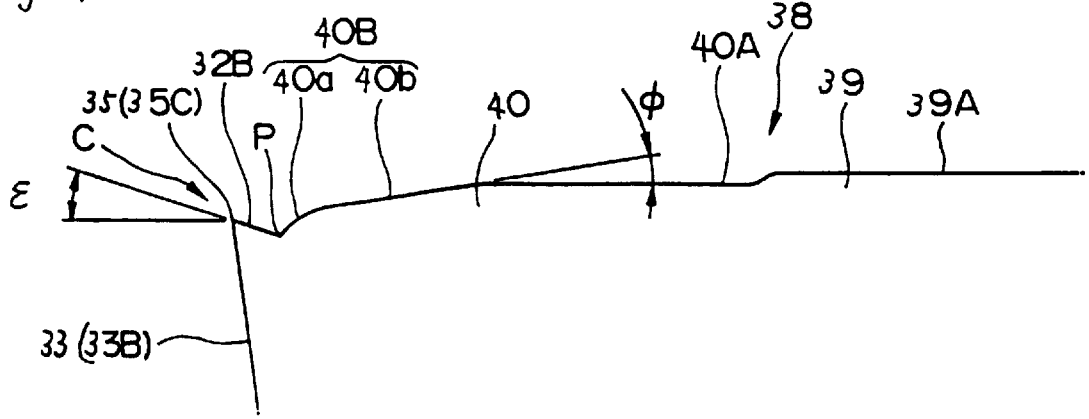
FIG. 19 is a sectional view taken at 19–19 in FIG. 16.
Figure 20:
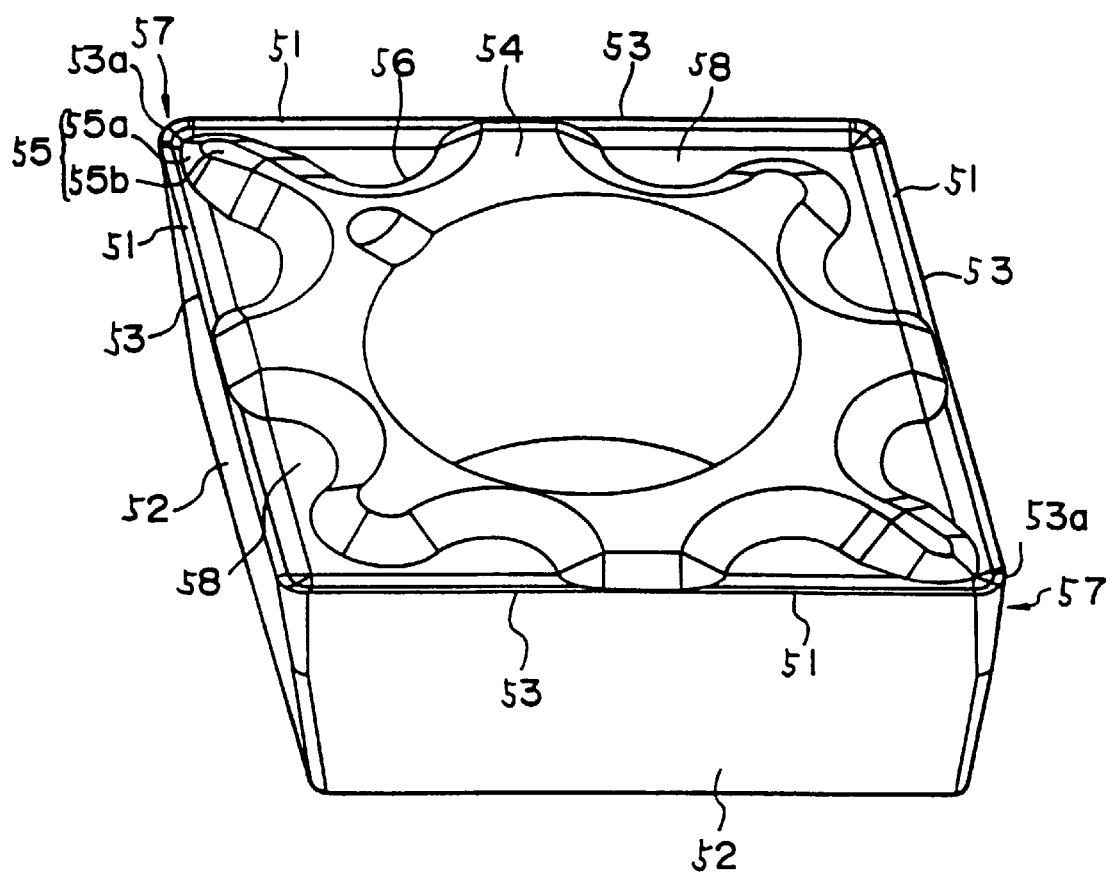
FIG. 20 is a perspective view showing an indexable insert according to a fourth embodiment of the present invention.

The third breaker wall 40*c* of the breaker wall surface 40B is formed to gradually descend toward its outer periphery substantially at a constant width (height) and gradient in its part extending from the upper surface 40A of the rib portion 40 through the first breaker wall 40*a*, and to gradually narrow toward the nose portion C in its part adjacent to the nose portion C as the first and second breaker walls 40*a*, 40*b* gradually descend toward the nose portion C, as shown in FIG. 19. Also, each of the lateral edges of the upper surface 40A has a convexly curved portion 41 formed to convexly curve outwardly in the plan view looking in the direction facing the rake face 32. Correspondingly, the first and third breaker walls 40*a*, 40*c* are also formed to convexly curve outward in the plan view looking in the direction facing the rake face 32 in their parts continuously joining with the convexly curved portion 41. In addition, each of the lateral edges of the upper surface 40A is formed to concavely curve inwardly in the plan view looking in the direction facing the rake face 32 in its part between the convexly curved portion 41 and the nose portion C. Correspondingly, the first and third breaker walls 40*a*, 40*c* are also formed to concavely curve inwardly in the plan view looking in the direction facing the rake face 32 in their parts continuously joining with the concavely curved portion of each of the lateral edges of the upper surface 40A.

Further, since the rake face 32 of the tip body 31 is formed to be substantially rhombic as described above, the rib portions 40 of the chip breaker 38 are formed such that one pair of rib portions 40 extending toward those of the four nose portions C of the rake face 32, at which the edges 34 intersect at an acute angle, are longer than the other pair of rib portions 40 extending toward those nose portions C at which the edges 34 intersect at an obtuse angle. The one pair of rib portions 40 having a longer length are each formed to concavely curve inwardly in the plan view looking in the direction facing the rake face 32 in its part between the convexly curved portion 41 of each lateral edge of the upper surface 40A and the attachment hole 37. Correspondingly, the first and third breaker walls 40*a*, 40*c* are also formed to concavely curve inwardly in the plan view looking in the direction facing the rake face 32 in their parts continuously joining with the concavely curved portion of each of the lateral edges of the upper surface 40A as with their parts nearer to the nose portion C.

On the other hand, part of the breaker wall surface 39B of the annular portion 39 of the chip breaker 38, which continuously joins with each of the breaker wall surfaces 40B of the rib portions 40, is also formed to concavely curve inwardly in the plan view looking in the direction facing the rake face 32. Accordingly, each of the rake face portions 32A continuously extending from the edges 34 is formed such that the width of the second rake face portion 32*b* in the plan view looking in the direction facing the rake face 32, i.e., in the direction perpendicular to the edge 34, is changed between the nose portions C in such a manner as to gradually increase with an increase of distance from the nose portion C, then to maximize at a joint between both the breaker wall surfaces 39B, 40B, then to gradually decrease along the annular breaker wall surface 39B, and then to minimize nearly at the center of the edge 34.

When the indexable insert thus constructed is employed to perform rough cutting during which an infeed and/or a feed is relatively large and an area extending from the nose portion edge 35 to the edge 34 is used, most of chips are produced by the edge 34 and the produced chips are broken into pieces in such a manner that they are subject to resistance while sliding over the rake face portion 32A continuously extending from the edge 34, and are then broken upon striking against the breaker wall surfaces 39B, 40B of the chip breaker 38. Here, in the indexable insert having the above-described construction, the breaker wall surface 40B of the chip breaker 38 has, in its area adjacent to the nose portion edge 35, the first breaker wall 40*a* rising from the rake face portion 32B of the rake face 32, and the second breaker wall 40*b* rising from the first breaker wall 40*a* more gently. Thus, the height of the rib portion 40 of the chip breaker 38 is kept small by the presence of the second breaker wall 40*b*. In rough cutting during which the area extending from the nose portion edge 35 to the edge 34 is used and thick and wide chips are produced, therefore, it is possible to prevent the chip ejection ability from deteriorating as to make the chips stuffed, to cause an excessive breaking action, and hence to invite a remarkable increase of the cut resistance. Further, in this embodiment, the width of the second rake face 32*b* of the rake face portion 32A continuously extending from the edge 34 is gradually increased with an increase of distance from the nose portion C, as described above. Stated otherwise, as an infeed is increased, the spacing from the edge 34 to the breaker walls 39B, 40B is also increased to ensure a large chip pocket. As a result, stuffing of the chips can be more reliably avoided.

Also, when the indexable insert is employed to perform general finish cutting during which an infeed and/or a feed is smaller than in the above case of rough cutting and almost the entire length of the nose portion edge 35 is used, chips are quickly broken into pieces because they are subject to resistance while sliding over the rake face portion 32B continuously extending from the nose portion edge 35, and are then broken upon striking against the first breaker wall 40a of the rib portion 40 of the chip breaker 38 which faces the nose portion edge 35 and protrudes at a steep gradient from the rake face portion 32B. Further, with the indexable insert having the above-described construction, since the spacing between the nose portion edge 35 and the fore end of the rib portion 40 can be set to the same distance as in the conventional indexable insert adapted for universal cutting as described later, it is possible in the general finish cutting to avoid an increase of the cut resistance caused by stuffing of chips, or to prevent deterioration of finished surface accuracy and shortening of the tip life due to vibration caused by an increase of the cut resistance.

When the indexable insert is employed to perform superfinish cutting during which an infeed and/or a feed is even smaller than in the case of general finish cutting, only part of the nose portion edge 35 is used and chips which are very thin and have a small width are produced. Because of the indexable insert having such a construction that the rake angle of the nose portion edge 35 is varied between both ends 35A, 35B of the nose portion edge 35 to gradually increase toward the center 35C lying on the bisector L from both ends 35A, 35B of the nose portion edge 35 as described above, the chips produced by the nose portion edge 35 are subject to a bending moment in the widthwise direction at the time of generation thereof, and are expelled in the lengthwise direction, i.e., the outgoing direction, in an easily breakable condition. In addition, since the rake angle of the nose portion edge 35 gradually increases toward the center 35C from both ends 35A, 35B, the rake surface portion 32B continuously extending from the nose portion edge 35 has the form of a valley that is sloped downwardly from both ends 35A, 35B toward the bisector L along the nose portion edge 35. Therefore, the chips produced in superfinish cutting are expelled to run along the valley defined by the rake face portion 32B toward the valley bottom.

Further, in the indexable insert having the above-described construction, since the first breaker wall 40a of the rib portion 40 of the chip breaker 38, which extends toward the nose portion C, protrudes at a steep gradient at the innermost end of the valley defined by the rake face portion 32B, the chips expelled to run along the valley bottom are broken into pieces upon striking against the first breaker wall 40a. Accordingly, the chips produced in an easily breakable condition are surely caused to strike against the first breaker wall 40a of the chip breaker 38 protruding at a steep gradient, and hence even the thin and narrow chips, which are produced in superfinish cutting, can be easily broken into pieces. As a result, efficient ejection of the chips can be achieved without forming the fore end of the chip breaker too close to the nose portion edge, or increasing the height of the chip breaker, or raising the breaker wall of the chip breaker at a steep gradient in its entirely as having been tried previously.

Thus, with the indexable insert having the above-described construction, the spacing between the nose portion edge 35 and the fore end of the rib portion 40 of the chip breaker 38, which faces the nose portion C, can be set to the same distance as in the conventional indexable insert adapted for universal cutting. Also, the height of the rib portion 40 of the chip breaker 38 and the gradient of the entire breaker wall surface 40B thereof can be kept small. This means that stuffing of chips is avoided and good chip ejection efficiency can be maintained when the indexable insert of this embodiment is employed to perform not only general finish cutting, but also rough cutting during which thick and wide chips are produced. Further, since an increase of the cut resistance caused by stuffing of chips is suppressed and resulting vibration is prevented, it is possible to avoid deterioration of the finished surface accuracy and shortening of the tip life. As a result, an indexable insert having high versatility, which is applicable to universal cutting ranging from superfinish cutting to general finish cutting and further to rough cutting, can be provided.

Moreover, in this embodiment, the rake angle of the nose portion edge 35 is set to exhibit a maximum angle $\epsilon$ at the position lying on the bisector L of the nose portion C of the rake face 32 in which the nose portion edge 35 is formed, i.e., in the position of the center 35C of the nose portion edge 35. Here, in the nose portion edge 35 convexly arc-shaped, an area around the center 35C of the nose portion edge 35 provides a distal end portion of the nose portion edge 35, and hence the area around the center 35C of the nose portion edge 35 is used in superfinish cutting or the like. With this embodiment, therefore, the nose portion edge 35 can be given with high sharpness, particularly, in the area around the center 35C of the nose portion edge 35, and better finished surface accuracy can be obtained. Still another advantage is that since the bottom of the valley defined by rake face portion 32B continuously extending from the nose portion edge 35 is formed to extend along the bisector L inwardly from the center 35C of the nose portion edge 35, the chips produced by the center 35C can be more surely guided along the valley bottom and quickly broken into pieces.

On the other hand, as the rake angle of the nose portion edge 35 is varied to become larger at the center 35C than at both ends 35A, 35B of the nose portion edge 35, a large edge angle can be secured at both ends 35A, 35B of the nose portion edge 35 and the edges 34 continuously extending from both ends 35A, 35B. It is therefore possible for the edges 34 and the nose portion edges 35 to have sufficient tip strength endurable to a cut load applied in general finish cutting and, particularly a large cut load applied in rough cutting, where both ends 35A, 35B of the nose portion edge 35 and the edges 34 are used. This also contributes to prolonging the tip life.

Furthermore, in this embodiment, the rake angle of the nose portion edge 35 is formed to gradually increase toward the position lying on the bisector L of the nose portion C from both ends 35A, 35B of the nose portion edge 35 on condition that the minimum rake angle $\delta$ at both ends 35A, 35B is set to be in the range of $-10°$ to $30°$ and the maximum rake angle $\epsilon$ at the center 35C of the nose portion edge 35 lying on the bisector L is set to be in the range of $0°$ to $40°$. The reasons are as follows. If the minimum rake angle $\delta$ at both ends 35A, 35B is less than $-10°$, the edges 34 continuously extending from both ends 35A, 35B would also have an insufficient rake angle, thus causing a possibility that the cut resistance may increase in universal cutting. On the contrary, if the minimum rake angle $\delta$ at both ends 35A, 35B is larger than $30°$, the edge angle of the edges 34 would be so small that the edges 34 may be damaged in universal cutting during which a large load is applied.

If the maximum rake angle ∈ at the center 35C of the nose portion edge 35 lying on the bisector L is less than 0°, the sharpness of the nose portion edge 35 would be deteriorated in the superfinish cutting, making it difficult to achieve good finished surface accuracy. On the contrary, if the maximum rake angle ∈ at the center 35C lying on the bisector L is larger than 40°, the edge angle of the distal end portion of the nose portion edge 35, i.e., the edge angle of the area around the center 35C, would be so small that the nose portion edge 35 may be damaged in the superfinish cutting of hard materials, for example. For the above reasons, the rake angle of the nose portion edge 35 is preferably set such that the minimum rake angle δ at both ends 35A, 35B of the nose portion edge 35 falls in the range of −10° to 30° and the maximum rake angle ∈ at the position lying on the bisector L falls in the range of 0° to 40° as described above in connection with this embodiment.

Besides, in this embodiment, the first breaker wall 40a of the breaker wall surface 40B of the rib portion 40 of the chip breaker 38 is formed into an arcuate shape in section so as to smoothly join with the upper surface 40A of the rib portion 40 and the second and third breaker walls 40b, 40c. Correspondingly, in a section taken along the bisector L, the first breaker wall 40a protrudes following a convexly curved line from the rake face portion 32B joining with the nose portion 35. As for the first breaker wall 40a, it may extend linearly at a steeper gradient than that of the second breaker wall 40b in the section taken along the bisector L. By forming the first breaker wall 40a to have such a configuration as described above in this embodiment, however, it is possible to protrude the first breaker wall 40a at a steeper gradient, particularly, in its rising portion from the rake face portion 32B against which the chips produced in superfinish cutting strike. As a result, the chips can be more reliably and efficiently broken into pieces.

As for the second breaker wall 40b, the reasons why its rising angle φ is set to be in the range of 1° to 30° in a section taken along the bisector L are as follows. If the rising angle φ is as small as less than 1°, the height of the rib portion 40 of the chip breaker 38 would be too low, thus causing a possibility that the breaking action developed upon the chips produced in the rough cutting, particularly, striking against the chip breaker 40 may be so weak as to impede those chips from being broken into pieces. On the contrary, if the rising angle φ is as large as more than 30°, the second breaker wall 40b would rise more steeply toward the nose portion edge 35 to make smaller a pocket space defined by the second breaker wall 40b and the nose portion edge 35, thus causing a possibility that the chip ejection ability may be so deteriorated as to bring about stuffing of chips, or that the chips produced in the rough cutting may be subject to excessive resistance by striking against the second breaker wall 40b, resulting in an increase of the cut resistance. It is hence preferable that the rising angle φ of the second breaker wall 40b be set to be in the range of 1° to 30° as described above in connection with this embodiment.

Next, FIGS. 20 to 25 show a fourth embodiment of the present invention. In these drawings, reference numeral 51 denotes a rake face, 52 denotes a flank face, 53 denotes an edge, 54 denotes a boss surface, and 55 denotes a breaker. An indexable insert of this embodiment is in the form of a plate being substantially rhombic in plan. A rake face 51 slopes at a positive rake angle in an outer peripheral area of the plate on the side of its upper surface. The edge 53 is formed along the ridge defined at an intersection between the rake face 51 and each of lateral peripheral surfaces of the plate which serve as the flank faces 52. Further, the breaker 55 is formed such that its wall surface rises from the rake face 51 in two steps and then continuously joins with a peripheral edge of the boss surface 54.

Figure 21:
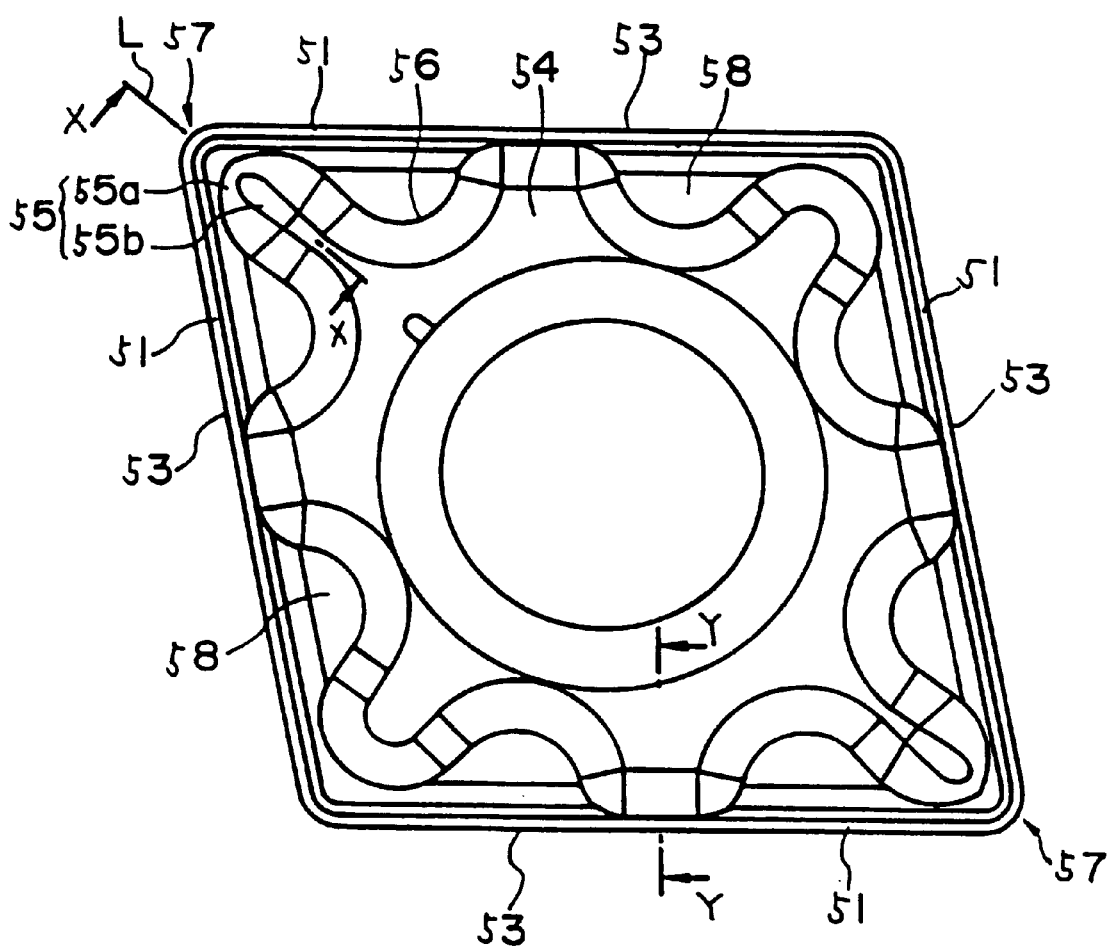
FIG. 21 is a plan view of the indexable insert according to the embodiment shown in FIG. 20.

At corners where the two edges 53 intersect and in areas facing substantially central portions of the edges 53, as shown in FIG. 21, the breaker 55 projects toward the corners and the edges 53, whereby an intersection (ridge) 56 between the breaker 55 and the rake face 51 extends in a wavy form. Also, at those of the four corners of the rake face 51 where the edges 53 adjacent to each other intersect at an acute angle (i.e., at nose portions 57), nose portion edges 53a are formed in a smoothly continuous relationship to the edges 53 on both sides.

Figure 22:
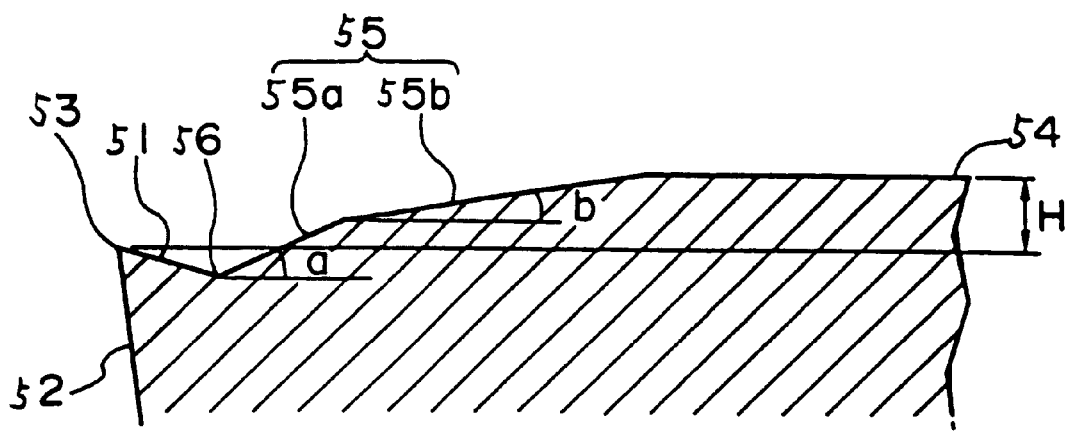
FIG. 22 is a vertical sectional view taken at 22–22 in FIG. 21.
Figure 23:
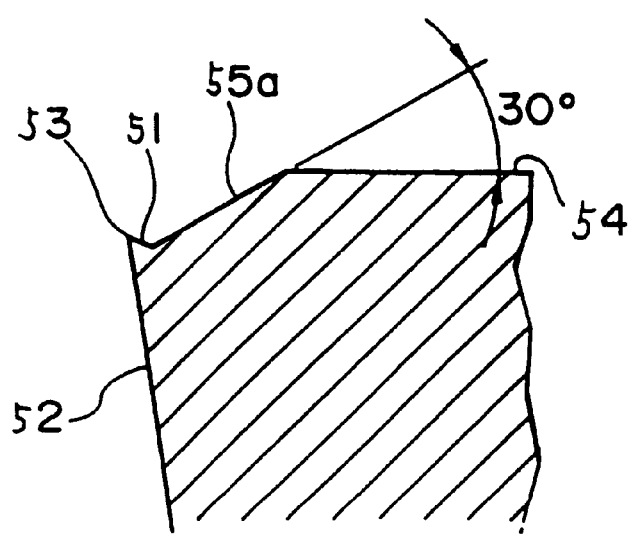
FIG. 23 is a vertical sectional view taken at 23–23 in FIG. 21.

The wall surface of the breaker 55 consists of a first breaker wall 55a which is formed to rise linearly from the intersection 56 between the breaker 55 and the rake face 51 in a section (see FIG. 22) taken along a line L bisecting the nose portion 57 in a plan view looking from a direction facing the rake face 51, i.e., taken along a bisector L of an angle formed between the edges 53 adjacent to each other, and a second breaker wall 55b which is formed to rise linearly at a gentler gradient than that of the first breaker wall 55a. Rising angles of the first breaker wall 55a and the second breaker wall 55b can be set appropriately depending on cut conditions such as properties of the material to be cut, the cutting speed, and the infeed. It is however preferable that the rising angles of the first breaker wall 55a and the second breaker wall 55b are set to satisfy the relationships below:

$$10°\leq a \leq 60° \text{ and } 1°\leq b \leq 30°$$

where the rising angle of the first breaker wall 55a is a and the rising angle of the second breaker wall 55b is b with a plane parallel to the bottom surface (lower surface) of the indexable insert being as the reference. In this embodiment, those rising angles are set to a=25° and b=9°, as shown in FIG. 22.

The reasons why the gradient of the first breaker wall 55a is set to be in the above range are as follows. If the rising angle a is smaller than 10°, the breaking action developed by the first breaker wall 55a would be too weak at a small infeed, thus causing a possibility that chips may tend to be more elongate and the chip ejection ability may deteriorate. If it is larger than 60°, the breaking action would be too strong, thus causing a possibility that chips may clog and the cut resistance may be increased even at a small infeed. Also, the reasons why the gradient of the second breaker wall 55b is set to be in the above range are as follows. If the rising angle b is smaller than 1°, the breaking action developed by the second breaker wall 55b would be too weak at a large infeed, thus causing a possibility that chips may elongate to ride over the breaker 55. If it is larger than 30°, the breaker height would be increased more than required in consideration of the depth of cut, and the breaking action would be too strong, thus causing a possibility that chips may clog and the cut resistance may be increased even at a large infeed. Additionally, in other areas than that facing the nose portion 57, the first breaker wall 55a is formed to rise at an angle of 30 from the rake face 51 or a flat portion 58 and to continuously join with the peripheral edge of the boss surface 54 without the second breaker wall 55b being interposed therebetween, as seen from, for example, a 23–23 section of FIG. 21 (see FIG. 23).

With the indexable insert of the fourth embodiment thus constructed, the chips cut from a workpiece by the edges 53 at a small infeed strike against the first breaker wall 55a facing the nose portion 57, and are forced to curl by the first breaker wall 55a to be broken into pieces. More specifically, in this embodiment, the second breaker wall 55b is sloped at a gentle gradient to avoid stuffing of chips at a large infeed, and a height H of the breaker 55 from the rake face 51 in the nose portion 57 is kept small, whereas the first breaker wall 55a, which develops the breaking action at a small infeed, is formed to rise at a steep gradient. Therefore, the chips produced at a small infeed can be surely broken into pieces and ejected without riding over the breaker 55. Also, since the second breaker wall 55b, which develops the breaking action at a large infeed, is formed to rise at a gentle gradient and the aforesaid height H of the breaker 55 is kept small, chips can also be surely broken into pieces and ejected without being stuffed at a large infeed as well.

Thus, according to the indexable insert of this fourth embodiment, since the gradient of the second breaker wall 55b is set to be gentle to keep down the height H of the breaker wall in its entirety and the gradient of the first breaker wall 55a rising from the intersection 56 is set to be steep, a high chip ejection ability can be obtained at any of small and large infeeds without increasing the cut resistance.

Figure 24:
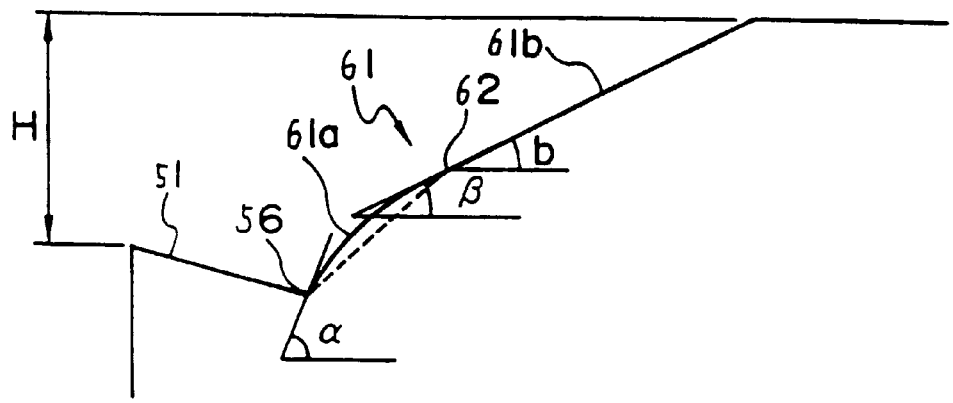
FIG. 24 is an enlarged sectional view showing a principal part of an indexable insert according to a fifth embodiment of the present invention.

A fifth embodiment of the indexable insert according to the present invention will be described below with reference to FIG. 24. An indexable insert of this fifth embodiment differs from the indexable insert of the above fourth embodiment in that a first breaker wall 61a is formed to rise following a convexly curved line in a section taken along the bisector L. More specifically, a wall surface of a breaker 61 consists of, as shown in FIG. 24, the first breaker wall 61a which rises from the intersection 56 between the breaker 61 and the rake face 51 following a convexly curved line in the section taken along the bisector L, and a second breaker wall 61b which rises linearly at a gentler gradient than that of the first breaker wall 61a.

It is preferable that the first breaker wall 61a and the second breaker wall 61b are formed to satisfy the relationships below:

$$10 \leq \alpha, \beta \leq 90° \text{ and } 1° \leq b \leq 30°$$

where the tangential angle of the first breaker wall 61a at the intersection 56 is a, the tangential angle of the first breaker wall 61a at an intersection 62 at which the first breaker wall 61a and the second breaker wall 61b intersect is β, and the rising angle of the second breaker wall 61b is b with a plane parallel to the bottom surface (lower surface) of the indexable insert being as a reference.

The reasons why the gradients of the first and second breaker walls are set to be in the above respective ranges are basically the same as those described above in connection with the fourth embodiment. In this embodiment, however, the tangential angle α of the first breaker wall 61a is gradually decreased in a direction toward the center of the indexable insert from the nose portion 57. By properly setting a reduction rate of the tangential angle α, therefore, the breaking action would be avoided from becoming too strong even if the tangential angle α is set to a large value at the intersection 56. For that reason, an upper limit of the tangential angle α is set to 90° at a maximum.

According to the indexable insert of this fifth embodiment, as with that of the above fourth embodiment, since the gradient of the second breaker wall 61b is set to be gentler than that of the first breaker wall 61a to keep down the height H of the breaker wall in its entirety and the gradient of the first breaker wall 61a rising from the intersection 56 is set to be steep, a high chip ejection ability can be obtained without increasing the cut resistance when the indexable insert is used in cutting at any of small and large infeeds. Further, since the first breaker wall 61a is formed to rise following a convexly curved line in the section taken along the bisector L, a steeper wall surface is formed in part of the first breaker wall 61a in comparison with the case where the first breaker wall 61a is formed to rise linearly from the intersection 56 as indicated by a broken line in FIG. 24. As a result, a stronger breaking action can be developed by the first breaker wall 61a and the chip ejection ability at a small infeed can be further enhanced.

Figure 25:
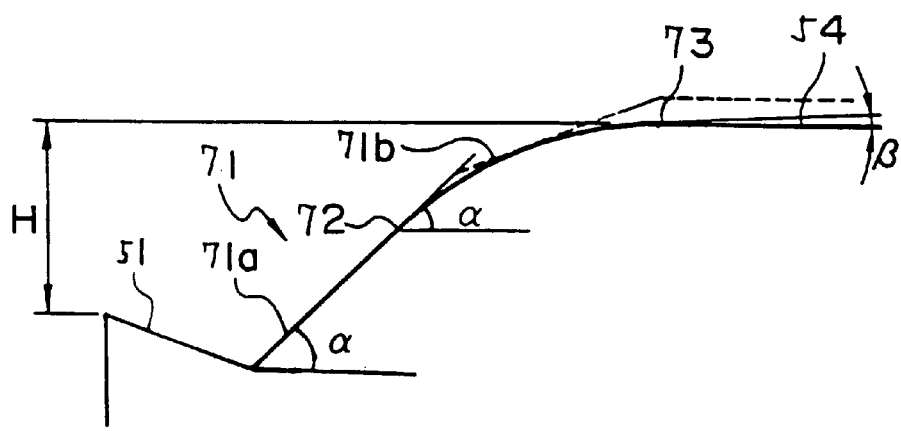
FIG. 25 is an enlarged sectional view showing a principal part of an indexable insert according to a sixth embodiment of the present invention.
Figure 26:
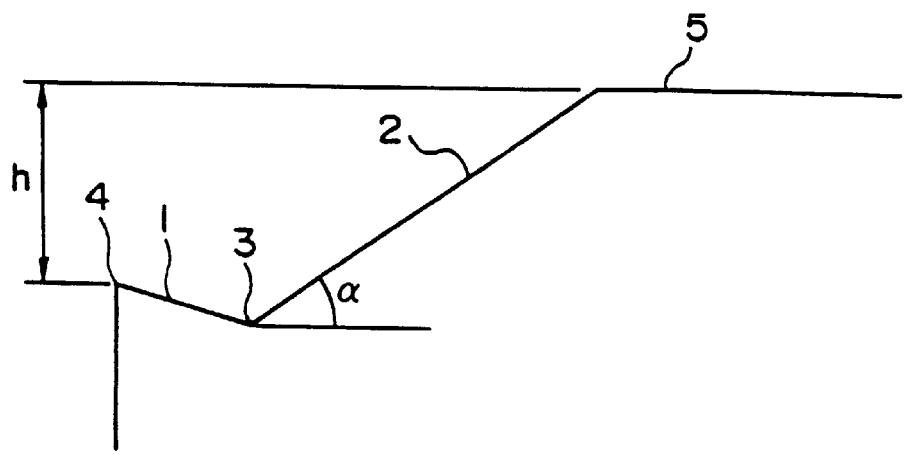
FIG. 26 is a vertical sectional view showing one example of a nose portion of a conventionally known indexable insert.
Figure 27:
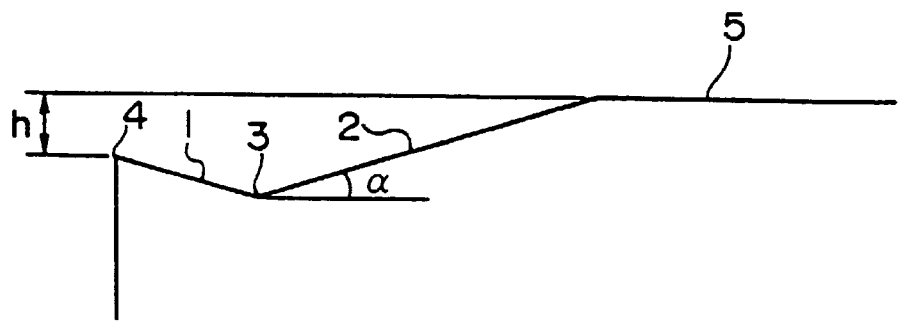
FIG. 27 is a vertical sectional view showing another example of a nose portion of a conventionally known indexable insert.
Figure 28:
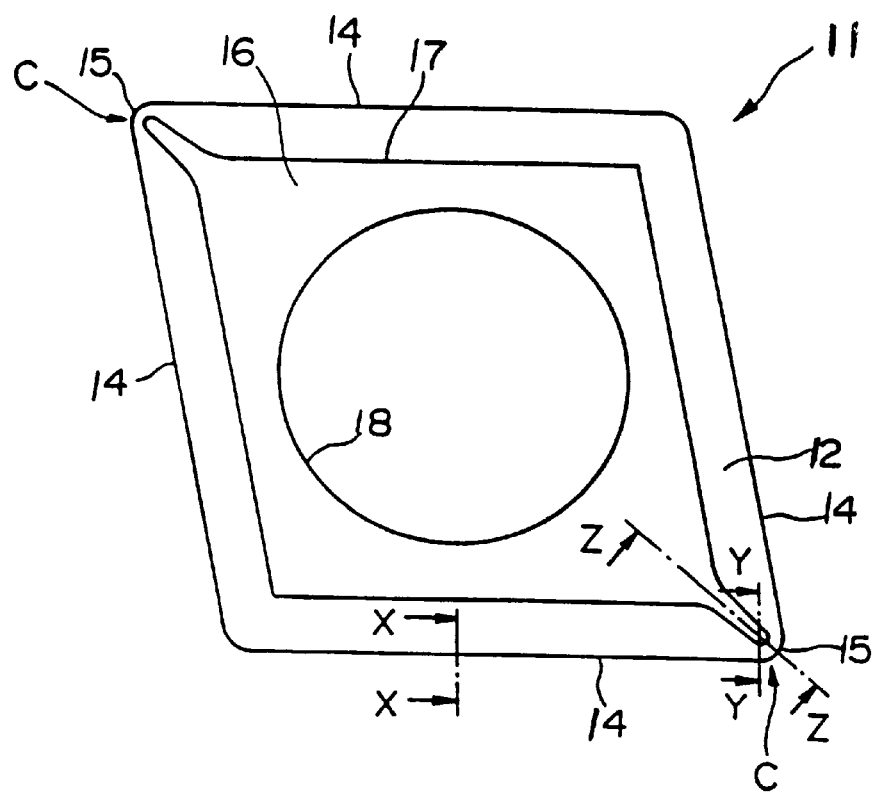
FIG. 28 is a plan view showing a conventionally proposed indexable insert.
Figure 29:
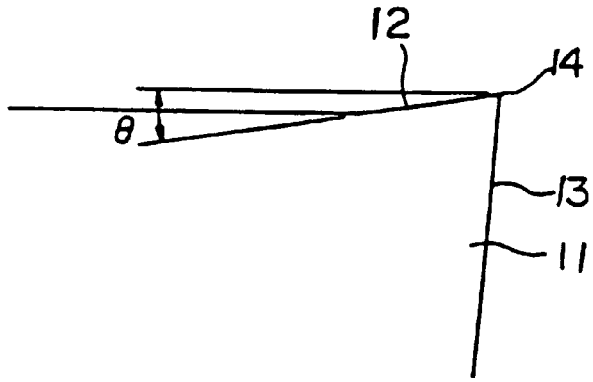
FIG. 29 is a sectional view taken at 29–29 in FIG. 28.
Figure 30:
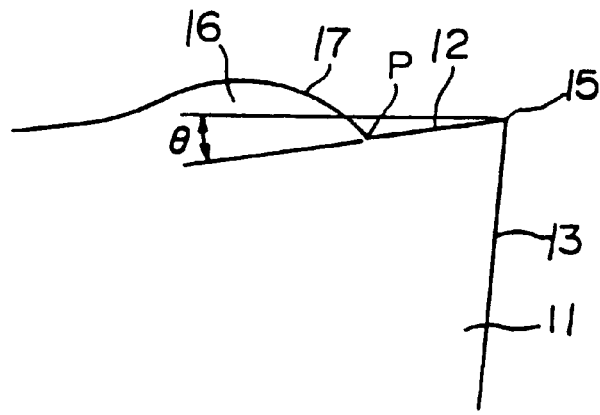
FIG. 30 is a sectional view taken at 30–30 in FIG. 28.
Figure 31:
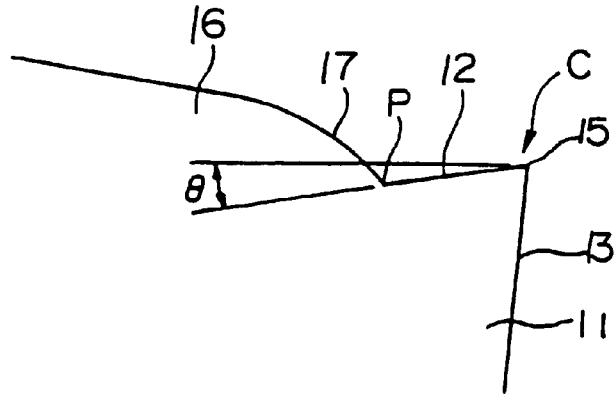
FIG. 31 is a sectional view taken at 31–31 in FIG. 28.

A sixth embodiment of the indexable insert according to the present invention will be described below with reference to FIG. 25. An indexable insert of this sixth embodiment differs from the indexable insert of the above fourth embodiment in that a second breaker wall 71b rises following a convexly curved line in a section taken along the bisector L. More specifically, a wall surface of a breaker 71 consists of, as shown in FIG. 25, a first breaker wall 71a which rises linearly from the intersection 56 between the breaker 71 and the rake face 51 in the section taken along the bisector L, and the second breaker wall 71b which rises following a convexly curved line from an intersection 72 at which the second breaker wall 71b intersects the first breaker wall 71a.

It is preferable that the first breaker wall 71a and the second breaker wall 71b are formed to satisfy the relationships below:

$$10° \leq a \leq 60° \text{ and } 0° \leq \alpha, \beta \leq 30°$$

where the rising angle of the first breaker wall 71a is a, the tangential angle of the second breaker wall 71b at the intersection 72 is a, and the tangential angle of the second breaker wall 71b at an upper end of the second breaker wall 71b, i.e., at an intersection 73 at which the second breaker wall 71b intersects the boss surface 54, is β with a plane parallel to the bottom surface (lower surface) of the indexable insert being a reference.

The reasons why the gradients of the first and second breaker walls are set to be in the above respective ranges are basically the same as those described above in connection with the fourth embodiment. In this embodiment, however, the tangential angle α of the second breaker wall 71b is gradually decreased in a direction toward the center of the indexable insert from the intersection 72. Therefore, the tangential angle β of the second breaker wall 71b at the intersection 73 may be eventually 0°. For that reason, a lower limit of the tangential angle β is set to 0°.

According to the indexable insert of this sixth embodiment, as with those of the above fourth and fifth embodiments, since the gradient of the second breaker wall 71b is set to be gentler than that of the first breaker wall 71a to keep down the height H of the breaker wall in its entirety and the gradient of the first breaker wall 71a rising from the intersection 56 is set to be steep, a high chip ejection ability can be obtained without increasing the cut resistance when the indexable insert is used in cutting at any of small and large infeeds. Further, since the second breaker wall 71b rises following a convexly curved line in the section taken along the bisector L, a gentler wall surface is formed in part of the second breaker wall 71b in comparison with the case where the second breaker wall 71b rises linearly from the first breaker wall 71a as indicated by a broken line in FIG. 25. Therefore, the height of the entire breaker can be kept small and the breaking action developed by the second breaker wall 71 b can be avoided from becoming excessive. As a result, an increase of the cut resistance at a large infeed can be suppressed so that an improvement of the chip ejection ability and a reduction of the cut resistance can be both achieved.

While, in the above fourth to sixth embodiments, the breakers 55, 61, 71 are described as two-step breakers comprising the first breaker walls 55*a*, 61*a*, 71*a* and the second breaker walls 55*b*, 61*b*, 71*b*, the breaker may have three or more steps instead of two steps. Also, the present invention may be modified by combining the feature of one of the indexable inserts of the above first to sixth embodiments with the feature of the indexable insert of another embodiment, for example, without departing from the scope of the invention.

What is claimed is:

1. An indexable insert comprising:
    a tip body formed of a polygonal flat plate, an upper surface of said tip body serving as a rake face;
    edges of said tip body being formed along an outer periphery of said rake face;
    the rake face having a sector-shaped portion at at least one corner of the rake face, an outer periphery of the sector-shaped portion forming a nose portion edge, the sector-shaped portion and having a rake angle which continuously increases along the outer periphery of the sector-shaped portion toward a center of the outer periphery of the sector-shaped portion;
    a chip breaker formed on said rake face to protrude upwardly from said rake face and to extend toward the outer periphery of the sector-shaped portion, the chip breaker having a first breaker wall protruding upwardly from said rake face and a second breaker wall protruding upwardly from said first breaker wall at a gentler gradient than that of said first breaker wall,
    wherein said first breaker wall and said second breaker wall satisfy the following relationships;

$$10°≤α,β≤90° \text{ and } 1°≤b≤30°$$

where a tangential angle of said first breaker wall at an intersection between said rake face and said first breaker wall is α, the tangential angle of said first breaker wall at an intersection between said first breaker wall and said second breaker wall is β, and a rising angle of said second breaker wall is b in the section taken along the center of the outer periphery of the sector-shaped portion.

2. The indexable insert according to claim 1, wherein the rake angle of the sector-shaped portion of the rake face is set to be in the range of −10° to 30° at both ends of the outer periphery of the sector-shaped portion and in the range of 0° to 40° at the center of the outer periphery of the sector-shaped portion.

3. The indexable insert according to claim 1, wherein said first breaker wall is formed to rise following a convexly curved line in a section taken along a bisector provided along the center of the outer periphery of the sector-shaped portion.

4. The indexable insert according to claim 1, wherein a rising angle of said second breaker wall is set to be in the range of 1° to 30°.

5. The indexable insert according to claim 1, wherein said first breaker wall and said second breaker wall are both rise linearly in a section taken along the center of the outer periphery of the sector-shaped portion.

6. The indexable insert according to claim 5, wherein said first breaker wall and said second breaker wall satisfy the following relationships;

$$10°≤a≤60° \text{ and } 1°≤b≤30°$$

where the rising angle of said first breaker wall is a and the rising angle of said second breaker wall is b in the section taken along the center of the outer periphery of the sector-shaped portion.

7. The indexable insert according to claim 1, wherein said first breaker wall rises following a convexly curved line and said second breaker wall rises linearly in a section taken along the center of the outer periphery of the sector-shaped portion.

8. A indexable insert according to claim 1, wherein said tip body has at least one flank face, the edges are formed along ridges defined at intersections between said rake face and said at least one flank face.

9. The indexable insert according to claim 1, wherein said first breaker wall is formed to rise linearly and said second breaker wall is formed to rise following a convexly curved line in a section taken along the center of the outer periphery of the sector-shaped portion.

10. An indexable insert comprising:
    a tip body formed of a polygonal flat plate, an upper surface of said tip body serving as a rake face;
    edges of said tip body being formed along an outer periphery of said rake face;
    the rake face having a sector-shaped portion at at least one corner of the rake face, an outer periphery of the sector-shaped portion forming a nose portion edge, the sector-shaped portion being a curved flat surface and having a rake angle which continuously increases along the outer periphery of the sector-shaped portion toward a center of the outer periphery of the sector-shaped portion;
    a chip breaker formed on said rake face to protrude upwardly from said rake face and to extend toward the outer periphery of the sector-shaped portion, the chip breaker having a first breaker wall protruding upwardly from said rake face and a second breaker wall protruding upwardly from said first breaker wall at a gentler gradient than that of said first breaker wall,
    wherein said first breaker wall and said second breaker wall are formed to satisfy the following relationships;

$$10°≤a≤60° \text{ and } 0°≤α,β≤30°$$

where the rising angle of said first breaker wall is a, a tangential angle of said second breaker wall at an intersection between said first breaker wall and said second breaker wall is α, and a tangential angle of said second breaker wall at an upper end of said second breaker wall is β in the section taken along the center of the outer periphery of the sector-shaped portion.

11. The indexable insert according to claim 10, wherein the rake angle of the sector-shaped portion of the rake face is set to be in the range of −10° to 30° at both ends of the outer periphery of the sector-shaped portion and in the range of 0° to 40° at the center of the outer periphery of the sector-shaped portion.

12. The indexable insert according to claim 10, wherein said first breaker wall is formed to rise following a convexly curved line in a section taken along a bisector provided along the center of the outer periphery of the sector-shaped portion.

13. The indexable insert according to claim 10, wherein a rising angle of said second breaker wall is set to be in the range of 1° to 30°.

14. The indexable insert according to claim 10, wherein said first breaker wall and said second breaker wall are both rise linearly in a section taken along the center of the outer periphery of the sector-shaped portion.

15. The indexable insert according to claim 14, wherein said first breaker wall and said second breaker wall satisfy the following relationships;

$$10° \leq a \leq 60° \text{ and } 1° \leq b \leq 30°$$

where the rising angle of said first breaker wall is a and the rising angle of said second breaker wall is b in the section taken along the center of the outer periphery of the sector-shaped portion.

16. The indexable insert according to claim 10, wherein said first breaker wall rises following a convexly curved line and said second breaker wall rises linearly in a section taken along the center of the outer periphery of the sector-shaped portion.

17. A indexable insert according to claim 10, wherein said tip body has at least one flank face, the edges are formed along ridges defined at intersections between said rake face and said at least one flank face.

18. The indexable insert according to claim 10, wherein said first breaker wall is formed to rise linearly and said second breaker wall is formed to rise following a convexly curved line in a section taken along the center of the outer periphery of the sector-shaped portion.

* * * * *